(12) United States Patent
Trivelpiece et al.

(10) Patent No.: US 10,621,841 B2
(45) Date of Patent: Apr. 14, 2020

(54) SYSTEM AND METHOD FOR TAG MANAGEMENT AND THEFT DETECTION

(71) Applicants: Steve E. Trivelpiece, Rancho Santa Margarita, CA (US); Craig E. Trivelpiece, Mission Viejo, CA (US); Hubert A. Patterson, Boca Raton, FL (US)

(72) Inventors: Steve E. Trivelpiece, Rancho Santa Margarita, CA (US); Craig E. Trivelpiece, Mission Viejo, CA (US); Hubert A. Patterson, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/221,695

(22) Filed: Dec. 17, 2018

(65) Prior Publication Data

US 2019/0197853 A1   Jun. 27, 2019

Related U.S. Application Data

(60) Provisional application No. 62/609,782, filed on Dec. 22, 2017.

(51) Int. Cl.
*G08B 13/24* (2006.01)
*G06K 19/07* (2006.01)
*G06K 7/10* (2006.01)

(52) U.S. Cl.
CPC ..... *G08B 13/2402* (2013.01); *G06K 7/10366* (2013.01); *G06K 19/0709* (2013.01);
(Continued)

(58) Field of Classification Search
CPC ............ G08B 13/2402; G08B 13/2462; G08B 13/2417; G06K 19/0723
(Continued)

(56) References Cited

U.S. PATENT DOCUMENTS 6,002,344 A * 12/1999 Bandy ................. G06K 7/0008
340/10.2
6,269,392 B1 * 7/2001 Cotichini .............. G06F 11/006
709/200
(Continued)

OTHER PUBLICATIONS

International Search Report and Written Opinion dated Mar. 11, 2019 for PCT/US2018/065911.

*Primary Examiner* — John A Tweel, Jr.
(74) *Attorney, Agent, or Firm* — Arent Fox LLP

(57) ABSTRACT

Systems and methods for managing a tag. The methods comprise: placing the tag in a first operational mode in which an internal component ("IC") necessary to facilitate communication between the tag and a tag reader ("TR") are intentionally disabled; storing in the tag's data store a schedule specifying a scheduled time during which the tag is permitted to communicate with TR; selectively enabling IC at the scheduled time to permit the tag to communicate with TR; performing monitoring operations at the tag to determine when a predetermined condition has been detected; and causing the tag to autonomously perform an alerting function when the predetermined condition has been detected. The alerting function comprises (a) enabling a receiver of the tag to communicate with TR at an unscheduled time, and/or (b) activating an alert by enabling a hardware alerting component provided on the tag.

27 Claims, 14 Drawing Sheets

(52) U.S. Cl.
CPC ..... *G06K 19/0723* (2013.01); *G08B 13/2462* (2013.01); *G08B 13/2417* (2013.01)

(58) Field of Classification Search
USPC ...................................................... 340/572.1
See application file for complete search history.

(56) References Cited

U.S. PATENT DOCUMENTS

| | | |
|---|---|---|
| 2007/0210920 A1 | 9/2007 | Panotopoulos |
| 2011/0072132 A1 | 3/2011 | Shafer et al. |
| 2019/0102727 A1* | 4/2019 | Trivelpiece ........ G06K 7/10039 |

\* cited by examiner

FIG. 10

Tag Response Message 1000
Unique Tag Identifier 1002

FIG. 11

Tag Response Message 1100
Unique Tag Identifier 1102
Motion Indicator 1104
Theft Notification 1106

SYSTEM AND METHOD FOR TAG MANAGEMENT AND THEFT DETECTION

CROSS-REFERENCE TO RELATED APPLICATIONS

This application claims the benefit of U.S. Patent Application Ser. No. filed on 62/609,782 filed Dec. 22, 2017. The forgoing patent application is hereby incorporated by reference in its entirety.

BACKGROUND

Statement of the Technical Field

The present disclosure relates generally to Radio Frequency Identification ("RFID") systems. More particularly, the present disclosure relates to implementing systems and methods for determining inventory using time slotted tag communications.

Description of the Related Art

Inventory solutions often use passive RFID tags because of their size, cost and mature infrastructure. However, passive RFID was never designed to support the vast number of tags, long read range, large number of readers, fast response times, location detection, and the high accuracy needed for a real-world solution.

Battery Assisted Passive ("BAP") RFID tags greatly help with the read range (increasing range from 1-10 meters to 15-100 meters) but also increase size, cost and complexity. In addition, the batteries must be replaced.

SUMMARY

The present document concerns systems and methods for managing a tag. The methods comprise: placing the tag in a first operational mode in which at least one internal component necessary to facilitate communication between the tag and a tag reader is disabled; storing in a data store of the tag a schedule specifying at least one scheduled time during which the tag is permitted to communicate with a tag reader; selectively enabling the internal component of the tag at the scheduled time(s) to permit the tag to communicate with the tag reader; performing monitoring operations at the tag to determine when at least one predetermined condition has been detected; and causing the tag to autonomously perform at least one alerting function when the at least one predetermined condition has been detected. The alerting function comprises (a) enabling a receiver of the tag to communicate with the tag reader at an unscheduled time, and/or (b) activating at least one alert by enabling a hardware alerting component provided on the tag.

In some scenarios, the predetermined condition is: a communication failure involving a failure to satisfy at least one measure of communication success with the tag reader over a predetermined period of time; a power management failure involving a failure to satisfy at least one measure of power management; and/or a motion condition detected at the tag using information received from a motion sensor included in the tag. The measure of power management comprises a rate of charge delivered to an energy storage device in the tag, a measure of the amount of charge in the energy storage device, a measure of effectiveness of a power harvesting operation, or a power management index value.

The methods may also comprise: enabling the at least one internal component which is necessary to facilitate communications with the tag reader at an unscheduled time immediately upon detecting the motion condition; transmitting at least one signal to the tag reader indicating when the tag has been stationary for a predetermined period time after motion was detected; selectively deactivating or powering down the at least one internal component to disable communications with the tag reader after the tag has been stationary for a predetermined period of time; and/or including in at least one transmitted communication to the tag reader motion indicator data to indicate that motion of the tag has been detected.

The methods may further comprise: monitoring received signals from the tag reader at least during a time period while said motion is detected; activating the at least one alert immediately upon determining that communication from the tag reader has been interrupted while communications with the tag reader are enabled; and/or transmitting at least one signal to the tag reader indicating a theft alert if communication with the tag reader is restored at any time subsequent to being interrupted.

In those or other scenarios, the methods further comprise: selectively controlling the alert by delaying the enabling of the hardware alerting component to a preset time period which has been established for human perceptible alerting; disabling the at least one internal component necessary for tag communications with the tag reader until a predetermined time slot or condition occurs; and/or disabling the at least one necessary internal components without powering down selected ones of a plurality of internal components. The necessary internal component comprises a timer and a motion sensor.

BRIEF DESCRIPTION OF THE DRAWINGS

The present solution will be described with reference to the following drawing figures, in which like numerals represent like items throughout the figures.

FIG. 10 is an illustration of a tag response message.

FIG. 11 is an illustration of another tag response message.

DETAILED DESCRIPTION

Figure 1:
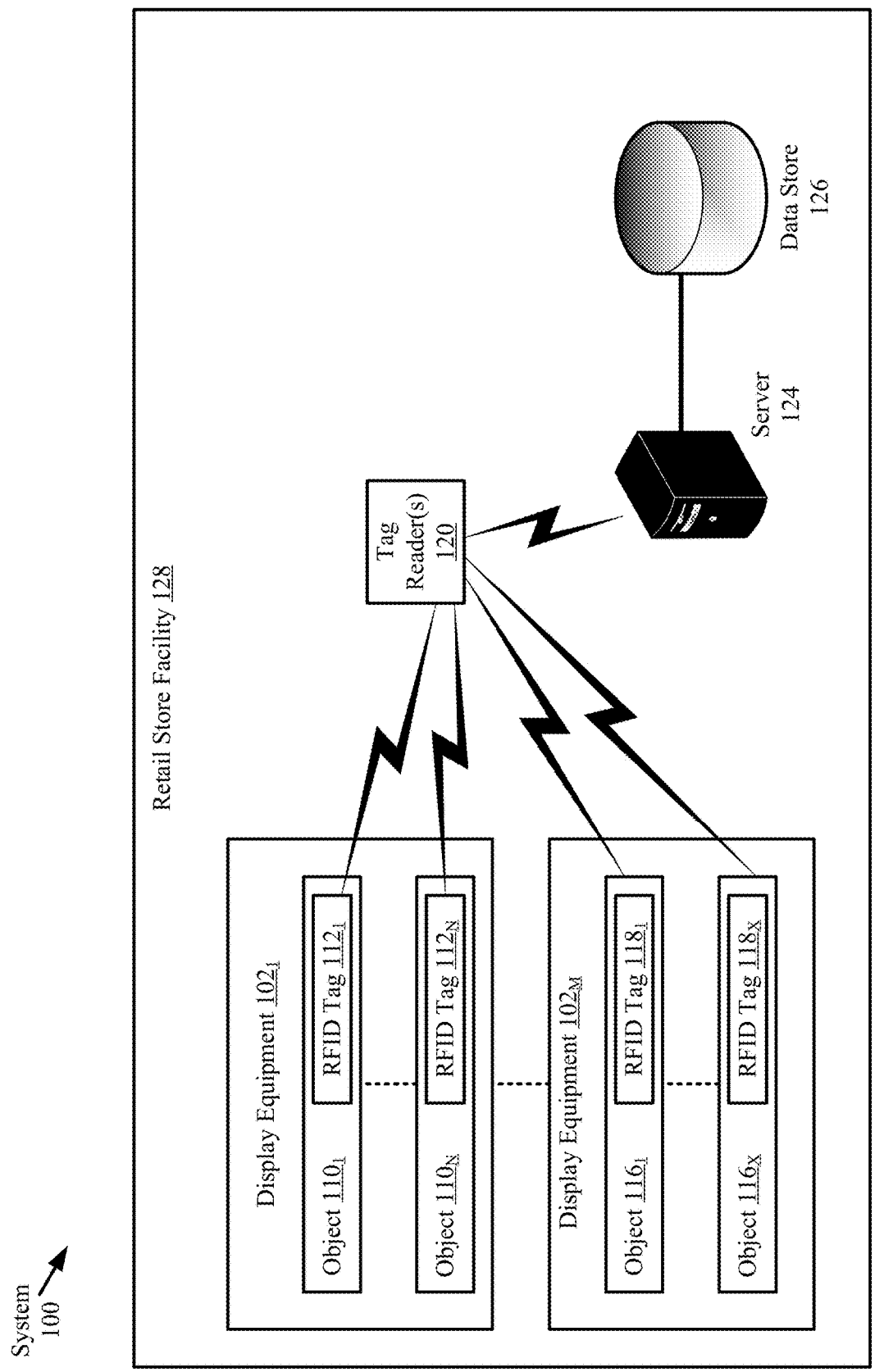
FIG. 1 is an illustration of an illustrative architecture for a system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

A solution disclosed herein concerns a tag (for example, an RFID tag) that has one or more indicators which are configured to alert people under certain predetermined conditions, and algorithms which execute on electronic control hardware within the tag to control the state of the indicators. The indicators can include one or more indicator types selected from the group consisting of a light emitting indicator (e.g., an LED), a sound emitting indicator (e.g., an audible tone generator) or a mechanical vibration generator. The solution further includes tag controls which are settable by a tag reader for maintaining state, status and timing of the detectable alerting function.

A solution which facilitates the foregoing begins with a tag that solves several problems which are associated with conventional tags. For example, a tag as disclosed herein will improve the read range of a passive RFID tag while keeping size, cost and response time low. In addition, the solution can advantageously include a very small, rechargeable power source (e.g., battery or capacitor) so that it keeps the cost and size low, and eliminates the need for battery changes. Low cost versions can use a non-rechargeable battery when a fixed battery has enough energy to last for the lifetime of the RFID tagged product.

According to one aspect, the present solution can use conventional RFID tags and readers (with a software update) which are modified to include certain additional hardware elements as described herein. According to another aspect, the present solution could be designed to incorporate the functioning into a new and compatible RFID tag chip as well. Initially, the RFID tag would need to be supplemented with a rechargeable power source (e.g., a battery and/or a capacitor), a Central Processing Unit ("CPU"), alert indicator(s), an accelerometer and/or motion detector.

Just as in normal RFID implementations, RFID tag readers are constantly scanning their Field Of View ("FOV") and requesting that all tags in its coverage area respond to interrogation signals. In locations which are densely populated with tags, this can sometimes result in difficulty detecting the tag responses because many tags can be responding concurrently to interrogation signals from one or more RFID tag readers. Also, conventional RFID tags typically respond to interrogation signals by transmitting basic tag data (such as tag identifying information) and this information has some value for inventory control purposes. But the basic tag data is often inadequate for many purposes such as tag management and theft prevention. The present solution solves these problems with several novel features which function cooperatively to facilitate the solution described herein.

The novel features include: (A) time or schedule based RFID tag communications interrupt control; (B) alert control systems and indicators, including alert indicators that can be directly perceived by humans; (C) a conditions-based communications interrupt control; and (D) a motion-based communications interrupt control. Within the tag, communications interrupt control in each case can be autonomously facilitated by the tag itself. The tag communications with a tag reader can be interrupted by disabling one or more of the tag components which are necessary for communications with the tag reader.

In some scenarios, such a communication interrupt can involve disabling a tag receiver portion of a transceiver. In other scenarios, communication interrupt control can be asserted by disabling a tag transmitter portion of a transceiver. In still other scenarios, both of these tag components can be disabled to facilitate a communication interrupt with respect to the tag reader.

As used herein, disabling can mean fully or partially powering down a component such as a receiver, transmitter or both (i.e., powering down the entire transceiver). In other scenarios, disabling a receiver, transmitter or transceiver can involve setting a control flag or bit to inhibit the operation of the particular component, while still leaving the component powered up. Another approach to facilitate a communication interrupt can involve disabling an input, output or control logic circuit operation which otherwise would function to facilitate a response to a tag interrogation signal. Two or more of the foregoing options can be used in combination to help reduce power consumption.

Briefly, the RFID tag control of (A) involves tag internal communication interrupt control whereby communication with a tag reader is permitted only at predetermined times and for predetermined durations under the exclusive control of the tag. Novel feature (A) facilitates better inventory counts, improved read ranges, reduced tag power consumption and reduced infrastructure costs. The RFID tag control of (B) provides certain advantages for tag management, maintenance and theft prevention. The RFID tag control of (C) can allow the tag to dynamically vary the times and durations of those periods when it will communicate with an RFID reader based on certain conditions detected by the tag. This is for improved tag utilization, management and maintenance. The RFID receiver control of feature (D) involves using the communication interrupt control to facilitate communication with a tag reader only at those times during which motion is detected. The tag continues to permit communications while in motion and for a short duration after the detected motion terminates. This is for loss prevention and tag location tracking. Each of these features are explained below in greater detail. Some of these features are configured to work together to facilitate further novel solutions and advantages.

Novel feature (A) provides better full inventory counts. In the present solution, the RFID chip is scheduled to only enable communications with a tag reader at certain times each day (e.g., one or two times a day) and for only a relatively brief interval. At other times, the tag internal communication interrupt control will disable (or turn off) such communication capability such that the tag will not communicate. As such, the communication interrupt control can prevent the tag from further communicating after communication with a tag reader completes or a timing window expires. The timing of the RFID tag communications is distributed among multiple RFID tags over a given time period (e.g., a day or 24 hours) so that any time slot will only be assigned to a very small percentage of the RFID tags. In an environment which includes many such RFID tags having similar capabilities this feature enables fast reading cycles, minimizes communications collisions, and enables identifying every tag.

Novel feature (A) also vastly reduces the drain on the battery of the RFID tag. The main power drain on the battery of an RFID tag as described herein is from the receiver and CPU. In the present solution, these components can be internally controlled by the tag so that they are only active for a few seconds per day (out of 86,400 seconds). The rest of the time the RFID tags can harvest energy for charging the battery from the received RF energy and other sources of energy harvesting. This allows for a very small, low cost rechargeable battery or capacitor. Still, it should be noted that a rechargeable energy storage is not required. For some applications a primary battery (e.g., a lithium coin cell) can be used without recharging. If a small battery can supply energy for the expected life-time of the tag, then a non-rechargeable battery could be used to reduce the costs. For example, a swing ticket could have a small battery that lasts less than one year.

In an environment which includes many RFID tags, novel feature (A) further improves tag read range which reduces infrastructure costs. Further, by using battery assisted tags, the tag read range can be extended from 1-10 meters to 15-100 meters. This combination of features significantly reduces infrastructure installation costs since less tag readers are needed to cover a given area as compared to that needed in conventional systems, while improving overall performance in previously hard to read areas.

Novel feature (B) can allow a tag to alert persons in the vicinity that the tag requires special attention. For example, the tag can generate an alert when it is having trouble communicating with RFID readers, or is having difficulty with harvesting sufficient energy. The alert can also be used when the tag detects conditions indicative of potential theft.

Novel feature (C) can be used to cause the tag to dynamically enable communications with an RFID reader (and/or dynamically vary a duration of time during which communications are enabled) based on certain conditions which are detected by the tag. This feature can facilitate staff management of tag locations within a facility to enable improved communication and/or improved power harvesting operations by the tag. When coupled with motion detection capabilities described herein, this feature can be further used to detect and/or thwart theft of items attached to the tag.

Novel feature (D) ensures that tags in motion respond to interrogation signals even at times when they are not scheduled to communicate during time slots. The system can now track an RFID tag while it is in motion and also detect where/when this tag motion stops. Accordingly, novel feature (D) can be used to facilitate theft detection and prevention. The functions, elements, and advantages associated with novel features A, B, C and D are described below in greater detail.

Conditional Alert Modes Involving Tag Communication Failures

A tag which incorporates novel feature (A) as disclosed herein is advantageously configured with memory and control circuitry (and/or software) such that it can know when, and how many times per day it is supposed to communicate with one or more tag reader devices. If attempts by the tag to communicate with an RFID reader during these set times are not successful after a certain period of time, the tag control system will cause the tag to transition into an alert mode. Such an alert mode can involve feature (C), i.e., a conditions-based receiver and/or transceiver control. In this scenario, the condition triggering the receiver or transceiver is a tag communication failure condition.

In an alert mode involving feature (C) based on a tag communication failure condition, the alert mode can result in certain hardware and/or software elements on the tag becoming active or enabled during certain extended times. For example, consider a scenario in which an alert mode has been triggered because the tag detects that it has failed to communicate with a reader according to a predetermined schedule. Under these circumstances, the control circuitry and/or software can enable an RFID radio receiver during extra time slots or time periods which are in addition to those times that the tag transceiver is otherwise caused to communicate with one or more tag readers. By extending or increasing the amount of time that the tag receiver and/or transceiver is active for purposes of communications, the chances of effecting such communication with tag readers is improved.

An alert mode involving a tag communication failure condition can also be used to trigger alert indicators associated with feature (B). In an alert mode involving feature (B), the alert mode can cause certain alerting hardware (e.g., a human perceptible indicator) to be activated or enabled.

Such alerting hardware can include one or more of a light emitting indicator, a sound emitting indicator, and/or a vibrator. These actions can facilitate actions by persons (e.g., technicians or store employees) to locate those tags that are in null or dead communication zones. Tag alert modes can be configured to only activate during specific times during the day such as when there are no customers and when the store is relatively quiet. This is used to facilitate finding the location of tags that have been unable to communicate with the readers. For example, alerting tags can be located by employees or technicians listening or looking for tags where optical or audible tag alerts are active. An active tone detector can also be utilized. The detector measures the frequency and repetition rate of the tone and then send its own alarm in response to the tag alarm. In some scenarios, the active tone detector can be used in conjunction with audio direction finding or location-finding equipment which identifies a direction and/or location of a tag which is alerting. Such direction or location-finding equipment can comprise a plurality of microphones for detecting the alert tone, and processing equipment which is designed to use the detected alert tone to facilitate location/direction finding.

Conditional Alert Modes Involving Tag Onboard Power Management

Tags disclosed herein can include an energy storage device (e.g., a fixed or non-rechargeable type battery, a rechargeable battery, or a capacitor) and energy harvesting systems to facilitate charging of the energy storage device. For example, the energy harvesting system can capture small amounts of energy from RF fields generated in the vicinity of the tags. The RF fields can be generated by those which are generated by the tag readers, broadband appliances used to facilitate wireless networks, and so on. Even so, the charge contained in the energy storage device can be depleted over time. For example, this can occur when tags are located in areas of a facility in which the RF field(s) needed for energy harvesting and charging operations are too weak. In such scenarios, the tag can enable an energy management alert mode. In some scenarios, the energy management alert mode can involve feature (C), i.e., a conditions-based receiver or transceiver control. In this instance, the condition triggering the receiver or transceiver is a power management failure condition. When such a condition is detected, the tag communication interrupt control system can enable the necessary tag internal communication components to facilitate communications with one or more tag readers. The resulting communications with the tag reader(s) can involve responding to tag reader interrogation signals by communicating status of the energy storage device and/or energy harvesting. Consequently, the tag reader/system can know the tag needs to be moved into an area of greater energy harvesting (or that more energy needs to be delivered to that zone). If the energy storage device has discharged, then the tag can operate in a passive mode (which does not rely on the battery). In such a scenario, the tag is powered using energy from an interrogation signal generated by a handheld or stationary reader. According to one aspect, the tag communication interrupt control system can be configured so that tag passive mode communications are always enabled under conditions where the energy storage device has discharged. The tag can then communicate that the energy storage device is discharged and can also optionally communicate some stored state information concerning the previous rate of energy harvesting.

Conditional Motion-Based Alert Modes

Motion-based alert modes in accordance with feature (D) are actually a special case of conditional alerting described herein which involves certain aspects of feature (C) (conditions-based receiver or transceiver control). In such a scenario, the conditional alert is based on inputs received from a motion sensor included in the tag. In a conditional motion-based alert, tag motion initiates a conditions-based control operation. In such a scenario, the tag communication interrupt control system will instantly enable communications with the reader(s) when tag motion is detected.

A tag in which communications are enabled should be receiving and responding to communications from tag readers while in motion. So when communications from the tag reader are no longer detected but motion continues, the tag can infer that the item to which it is attached is in the process of being stolen and that some blocking method has been applied to stop communications. In such a scenario, the tag will enable a further conditional motion-based alert response whereby an alert indicator associated with feature (B) is made active so that an employee or security personnel in the vicinity can be made aware that a potential theft is in progress.

Note that the tag reader (and any associated inventory control infrastructure) will be made aware that a tag is in motion (based on communications from the tag prior to any blocking). Recall that the communications which are enabled by the motion sensing at the tag are configured to continue until the tag determines that it has stopped moving for a period of time. And the tag can be further configured so that prior to disabling its receiver or transceiver at such time, the tag will communicate to the reader that motion has stopped. So if the tag stops communicating with the reader without communicating that motion has stopped, then the reader can likewise infer that the item attached to the tag is in the process of being stolen. If the tag resumes communications with reader(s) at some point in time while in motion, it can likewise communicate that its algorithm is showing it is being stolen or can communicate some history of being out of communications with the reader.

As an example, consider a scenario in which an item to which the tag is attached is moved by a person (e.g., when a person in a retail store moves an item from a display rack). The tag will detect such motion and immediately enable a communication session with a reader (e.g., by enabling the tag receiver or transceiver, and responding to reader interrogations using the tag transmitter). In some scenarios, the person who moved the item to which the tag is attached may be an ordinary shopper. The tag will communicate with the tag reader for the duration of time while the item is being handled and/or the tag is in motion. When the item is replaced on the rack or purchased, the tag motion will eventually terminate. At this point, the tag will communicate to the reader information concerning the cessation of motion. After some period of time during which the tag communication interrupt control system determines that the tag is stationary, the tag control system will automatically take actions to interrupt further communication with the tag reader. For example, this can involve powering down a receiver, a transmitter, or transceiver circuitry associated with the tag. With these components shut down, the tag can advantageously return to a power conserving mode of operation. Configurable settings can determine how long a tag will continue to try to communicate its status to the reader after it is stationary before powering down its transceiver. Once the status is successfully communicated, the tag communication interrupt control system can disable further communications with a tag reader.

In other scenarios, the person who moves the item to which the tag is attached will be a person who is actively attempting to steal the item. It is known that one way in which thieves attempt to thwart anti-theft tags is by blocking the ability of the tag to communicate with a tag reader. For example, the tag may be placed inside a foil-lined bag and/or clasped inside the user's hand to interfere with RF transmissions. But in the solution described herein, the enabling of communications immediately upon detection of motion should allow the tag reader(s) to have sufficient time to communicate with most tags in motion at least once before some method of blocking communications can be employed by a possible thief.

Actions associated with a conditional motion-based alert can optionally involve enabling other communications hardware elements in the tag. The other communication hardware elements are advantageously selected so that they are capable of facilitating communications that are not as easily blocked as compared to conventional RFID transmissions. For example, these can include radio frequency transmissions at specific frequency or wavelength ranges that are substantially immune to conventional RF blocking techniques.

Illustrative Systems

Referring now to FIG. 1, there is provided an illustration of an illustrative system 100 that is useful for understanding the present solution. The present solution is described herein in relation to a retail store environment. The present solution is not limited in this regard, and can be used in other environments. For example, the present solution can be used in distribution centers, factories and other commercial environments. Notably, the present solution can be employed in any environment in which objects and/or items need to be located and/or tracked.

The system 100 is generally configured to allow improved inventory counts of objects and/or items located within a facility. As shown in FIG. 1, system 100 comprises a Retail Store Facility ("RSF") 128 in which display equipment $102_1, \ldots, 102_M$ is disposed. The display equipment is provided for displaying objects (or items) $110_1$-$110_N$, $116_1$-$116_X$ to customers of the retail store. The display equipment can include, but is not limited to, shelves, article display cabinets, promotional displays, fixtures and/or equipment securing areas of the RSF 128. The RSF can also include emergency equipment (not shown), checkout counters and an EAS system (not shown). Emergency equipment, checkout counters, and EAS systems are well known in the art, and therefore will not be described herein. Video equipment can be provided for capturing video of events within the RSF and, in some scenarios, people counters can be provided to track the number of persons in the store.

At least one tag reader 120 is provided to assist in counting the objects $110_1$-$110_N$, $116_1$-$116_X$ located within the RSF 128. The tag reader 120 comprises an RFID reader configured to read RFID tags. RFID tags $112_1$-$112_N$, $118_1$-$118_X$ are respectively attached or coupled to the objects $110_1$-$110_N$, $116_1$-$116_X$. The RFID tags are described herein as comprising single-technology tags that are only RFID enabled. The present solution is not limited in this regard. The RFID tags can alternatively or additionally comprise dual-technology tags that have both EAS and RFID capabilities.

Notably, the tag reader 120 is strategically placed at a known location within the RSF 128. By correlating the tag reader's RFID tag reads and the tag reader's known location within the RSF 128, it is possible to determine the location of objects $110_1, \ldots, 110_N$, $116_1, \ldots, 116_X$ within the RSF 128. The tag reader's known coverage area also facilitates object location determinations. Accordingly, RFID tag read information and tag reader location information is stored in a data store 126. This information can be stored in the data store 126 using a server 124. Server 124 will be described in more detail below in relation to FIG. 4.

Figure 2:
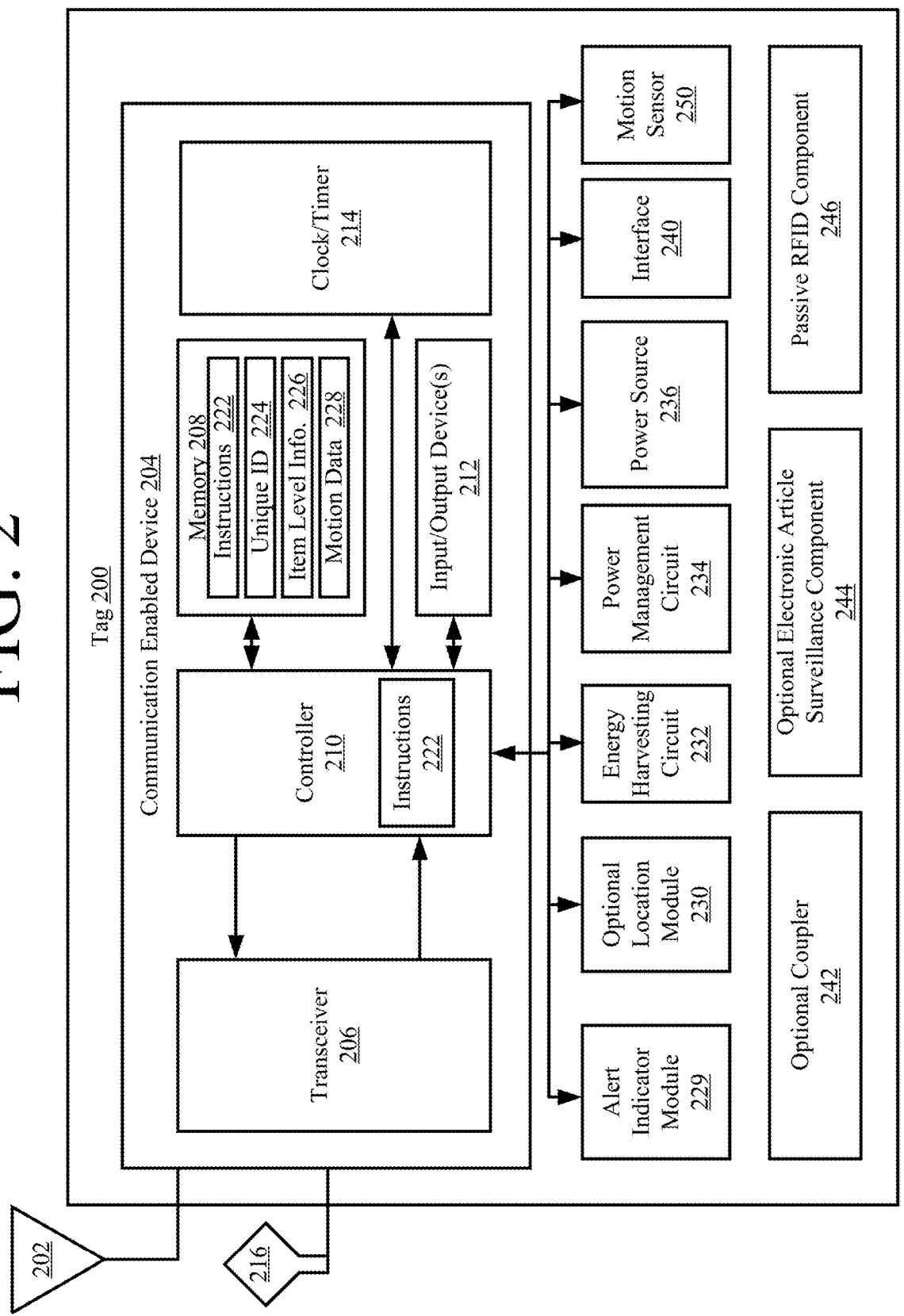
FIG. 2 is an illustration of an illustrative architecture for a tag.

Referring now to FIG. 2, there is an illustration of an illustrative architecture for a tag 200. RFID tags $112_1, \ldots, 112_N$, $118_1, \ldots, 118_X$ are the same as or similar to tag 200. As such, the discussion of tag 200 is sufficient for understanding the RFID tags $112_1, \ldots, 112_N$, $118_1, \ldots, 118_X$ of FIG. 1. Tag 200 is generally configured to perform operations to (a) minimize power usage so as to extend a power source's life (e.g., a battery or a capacitor), (b) minimize collisions with other tags so that the tag of interest can be seen at given times, (c) optimize useful information within an inventory system (e.g., communicate useful change information to a tag reader), and/or (d) optimize local feature functions.

The tag 200 can include more or less components than that shown in FIG. 2. However, the components shown are sufficient to disclose an illustrative embodiment implementing the present solution. Some or all of the components of the tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative tag 200 configured to facilitate improved inventory management. In this regard, the tag 200 is configured for allowing data to be exchanged with an external device (e.g., tag reader 120 of FIG. 1 and/or server 124 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; and/or LiFi technology. Each of the listed wireless communication technologies is well known in the art, and therefore will not be described in detail herein. Any known or to be known wireless communication technology or other wireless communication technology can be used herein without limitation.

The components 206-214 shown in FIG. 2 may be collectively referred to herein as a communication enabled device 204, and include a memory 208 and a clock/timer 214. Memory 208 may be a volatile memory and/or a non-volatile memory. For example, the memory 208 can include, but is not limited to, Random Access Memory ("RAM"), Dynamic RAM ("DRAM"), Static RAM ("SRAM"), Read Only Memory ("ROM") and flash memory. The memory 208 may also comprise unsecure memory and/or secure memory.

In some scenarios, the communication enabled device 204 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 208. Notably, the communication protocols can be downloaded to the device at any given time. The initial/ default role (being an RFID, WiFi, LiFi, etc. tag) can be assigned at the deployment thereof. If the user desires to use another protocol at a later time, the user can remotely change the communication protocol of the deployed tag 200. The update of the firmware, in case of issues, can also be performed remotely.

As shown in FIG. 2, the communication enabled device 204 comprises at least one antenna 202, 216 for allowing data to be exchanged with the external device via a wireless communication technology (e.g., an RFID technology, an NFC technology and/or a SRC technology). The antenna 202, 216 is configured to receive signals from the external device and/or transmit signals generated by the communication enabled device 204. The antenna 202, 216 can comprise a near-field or far-field antenna. The antennas include, but are not limited to, a chip antenna or a loop antenna.

The communication enabled device 204 also comprises a communication device (e.g., a transceiver or transmitter) 206. Communication devices (e.g., transceivers or transmitters) are well known in the art, and therefore will not be described herein. However, it should be understood that the communication device 206 can include a receiver and a transmitter portion. The transceiver generates and transmits signals (e.g., RF carrier signals) to external devices, as well as receives signals (e.g., RF signals) transmitted from external devices. In this way, the communication enabled device 204 facilitates the registration, identification, location and/or tracking of an item (e.g., object 110 or 112 of FIG. 1) to which the tag 200 is coupled.

The communication enabled device 204 is configured so that it: communicates (transmits and receives) in accordance with a time slot communication scheme; and selectively enables/disables/bypasses the communication device (e.g., the transceiver) or at least one communications operation based on output of a motion sensor 250. In some scenarios, the communication enabled device 204 selects: one or more time slots from a plurality of time slots based on the tag's unique identifier 224 (e.g., an Electronic Product Code ("EPC")); and/or determines a Window Of Time ("WOT") during which the communication device (e.g. transceiver) 206 is to be turned on or at least one communication operation is enabled) subsequent to when motion is detected by the motion sensor 250. The WOT can be determined based on environmental conditions (e.g., humidity, temperature, time of day, relative distance to a location device (e.g., beacon or location tag), etc.) and/or system conditions (e.g., amount of traffic, interference occurrences, etc.). In this regard, the tag 200 can include additional sensors not shown in FIG. 2.

The communication enabled device 204 also facilitates the automatic and dynamic modification of item level information 226 that is being or is to be output from the tag 200 in response to certain trigger events. The trigger events can include, but are not limited to, the tag's arrival at a particular facility (e.g., RSF 128 of FIG. 1), the tag's arrival in a particular country or geographic region, a date occurrence, a time occurrence, a price change, and/or the reception of user instructions.

Item level information 226 and a unique identifier ("ID") 224 for the tag 200 can be stored in memory 208 of the communication enabled device 204 and/or communicated to other external devices (e.g., tag reader 120 of FIG. 1 and/or server 124 of FIG. 1) via communication device (e.g., transceiver) 206 and/or interface 240 (e.g., an Internet Protocol or cellular network interface). For example, the communication enabled device 204 can communicate information specifying a timestamp, a unique identifier for an item, item description, item price, a currency symbol and/or location information to an external device. The external device (e.g., server) can then store the information in a database (e.g., database 126 of FIG. 1) and/or use the information for various purposes.

The communication enabled device 204 also comprises a controller 210 (e.g., a CPU) and input/output devices 212. The controller 210 can execute instructions 222 implementing methods for facilitating inventory counts and management. In this regard, the controller 210 includes a processor (or logic circuitry that responds to instructions) and the memory 208 includes a computer-readable storage medium on which is stored one or more sets of instructions 222 (e.g., software code) configured to implement one or more of the methodologies, procedures, or functions described herein. The instructions 222 can also reside, completely or at least partially, within the controller 210 during execution thereof by the tag 200. The memory 208 and the controller 210 also can constitute machine-readable media. The term "machine-readable media", as used here, refers to a single medium or multiple media (e.g., a centralized or distributed database, and/or associated caches and servers) that store the one or more sets of instructions 222. The term "machine-readable media", as used here, also refers to any medium that is capable of storing, encoding or carrying a set of instructions 222 for execution by the tag 200 and that cause the tag 200 to perform any one or more of the methodologies of the present disclosure.

In some scenarios a tag communication interrupt control system as descried herein can be implemented by the controller 210, based on instructions 222 and other information contained in memory 208. The communication interrupt control system can also involve use of the clock/timer 214 and certain control circuitry associated with the transceiver 206.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 200 (e.g., when motion thereof has been detected) and/or for notifying the person of a particular pricing status (e.g., on sale status) of the item to which the tag is coupled.

The clock/timer 214 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 200 also includes an alert indicator module 229. The alert indicator module 229 includes one or more hardware elements which produce a human perceptible alert signal when activated or enabled. The alert indicator module 229 is responsive to signals received from the controller 210, whereby the alert indicators can be activated and deactivated as needed in response to certain conditions detected by the controller. Examples of hardware elements that can be included in the alert indicator module 229 include one or more of an optical emitter, an audio emitter, and a vibration generator. Devices suitable for this purpose can include Light Emitting Diodes ("LEDs"), loudspeakers, audible tone generators, mechanical vibrators, and associated drive circuitry.

The tag 200 also comprises an optional location module 230. The location module 230 is generally configured to determine the geographic location of the tag at any given time. For example, in some scenarios, the location module 230 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 242 is provided to securely or removably couple the tag 200 to an item (e.g., object 110 or 112 of FIG. 1). The coupler 242 includes, but is not limited to, a mechanical coupling means (e.g., a strap, clip, clamp, snap) and/or adhesive (e.g., glue or sticker). The coupler 242 is optional since the coupling can be achieved via a weld and/or chemical bond.

The tag 200 can also include a power source 236, an optional Electronic Article Surveillance ("EAS") component 244, and/or a passive/active/semi-passive RFID component 246. Each of the listed components 236, 244, 246 is well known in the art, and therefore will not be described herein. Any known or to be known battery, EAS component and/or RFID component can be used herein without limitation. The power source 236 can include, but is not limited to, a rechargeable battery and/or a capacitor.

As shown in FIG. 2, the tag 200 further comprises an energy harvesting circuit 232 and a power management circuit 234 for ensuring continuous operation of the tag 200 without the need to change the rechargeable power source (e.g., a battery). In some scenarios, the energy harvesting circuit 232 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

As noted above, the tag 200 may also include a motion sensor 250. Motion sensors are well known in the art, and therefore will not be described herein. Any known or to be known motion sensor can be used herein without limitation. For example, the motion sensor 250 includes, but is not limited to, a vibration sensor, an accelerometer, a gyroscope, a linear motion sensor, a Passive Infrared ("PIR") sensor, a tilt sensor, and/or a rotation sensor.

The motion sensor 250 is communicatively coupled to the controller 210 such that it can notify the controller 210 when tag motion is detected. The motion sensor 250 also communicates sensor data to the controller 210. The sensor data is processed by the controller 210 to determine whether or not the motion is of a type for triggering enablement of the communication device (e.g., transceiver) 206 or at least one communication operation. For example, the sensor data can be compared to stored motion data 228 to determine if a match exists therebetween. More specifically, a motion pattern specified by the sensor data can be compared to a plurality of motion patterns specified by the stored motion data 228. The plurality of motion patterns can include, but are not limited to, a motion pattern for walking, a motion pattern for running, a motion pattern for vehicle transport, and/or a motion pattern for vibration caused by equipment of a machine in proximity to the tag (e.g., an air conditioner or fan). The type of movement (e.g., vibration or being carried) is then determined based on which stored motion data matches the sensor data. This feature of the present solution allows the tag communication interrupt control system to selectively enable tag communications with a tag reader only when the tag's location within a facility is actually being changed (e.g., and not when a fan is causing the tag to simply vibrate).

In some scenarios, the tag 200 can be also configured to enter a sleep state in which at least the motion sensor triggering of communication operations is disabled. This is desirable, for example, in scenarios when the tag 200 is being shipped or transported from a distributor to a customer. In those or other scenarios, the tag 200 can be further configured to enter the sleep state in response to its continuous detection of motion for a given period of time. The tag can be transitioned from its sleep state in response to expiration of a defined time period, the tag's reception of a control signal from an external device, and/or the tag's detection of no motion for a period of time.

The power management circuit 234 is generally configured to control the supply of power to components of the tag 200. In the event all of the storage and harvesting resources deplete to a point where the tag 200 is about to enter a shutdown/brownout state, the power management circuit 234 can cause an alert to be sent from the tag 200 to a remote device (e.g., tag reader 120 or server 124 of FIG. 1). In response to the alert, the remote device can inform an associate (e.g., a store employee) so that (s)he can investigate why the tag 200 is not recharging and/or holding charge.

The power management circuit 234 is also capable of redirecting an energy source to the tag's 200 electronics based on the energy source's status. For example, if harvested energy is sufficient to run the tag's 200 function, the power management circuit 234 confirms that all of the tag's 200 storage sources are fully charged such that the tag's 200 electronic components can be run directly from the harvested energy. This ensures that the tag 200 always has stored energy in case harvesting source(s) disappear or lesser energy is harvested for reasons such as drop in RF, light or vibration power levels. If a sudden drop in any of the energy sources is detected, the power management circuit 234 can cause an alert condition to be sent from the tag 200 to the remote device (e.g., tag reader 120 or server 124 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

The present solution is not limited to that shown in FIG. 2. The tag 200 can have any architecture provided that it can perform the functions and operations described herein. For example, all of the components shown in FIG. 2 can comprise a single device (e.g., an Integrated Circuit ("IC")). Alternatively, some of the components can comprise a first tag element (e.g., a Commercial Off The Shelf ("COTS") tag) while the remaining components comprise a second tag element communicatively coupled to the first tag element. The second tag element can provide auxiliary functions (e.g., motion sensing, etc.) to the first tag element. The second tag element may also control operational states of the first tag element. For example, the second tag element can selectively (a) enable and disable one or more features/operations of the first tag element (e.g., transceiver operations), (b) couple or decouple an antenna to and from the first tag element, (c) bypass at least one communications device or operation, and/or (d) cause an operational state of the first tag element to be changed (e.g., cause transitioning the first tag element between a power save mode and non-power save mode). In some scenarios, the operational state change can be achieved by changing the binary value of at least one state bit (e.g., from 0 to 1, or vice versa) for causing certain communication control operations to be performed by the tag 200. Additionally or alternatively, a switch can be actuated for creating an c loser or open circuit. The present solution is not limited in this regard.

Figure 3:
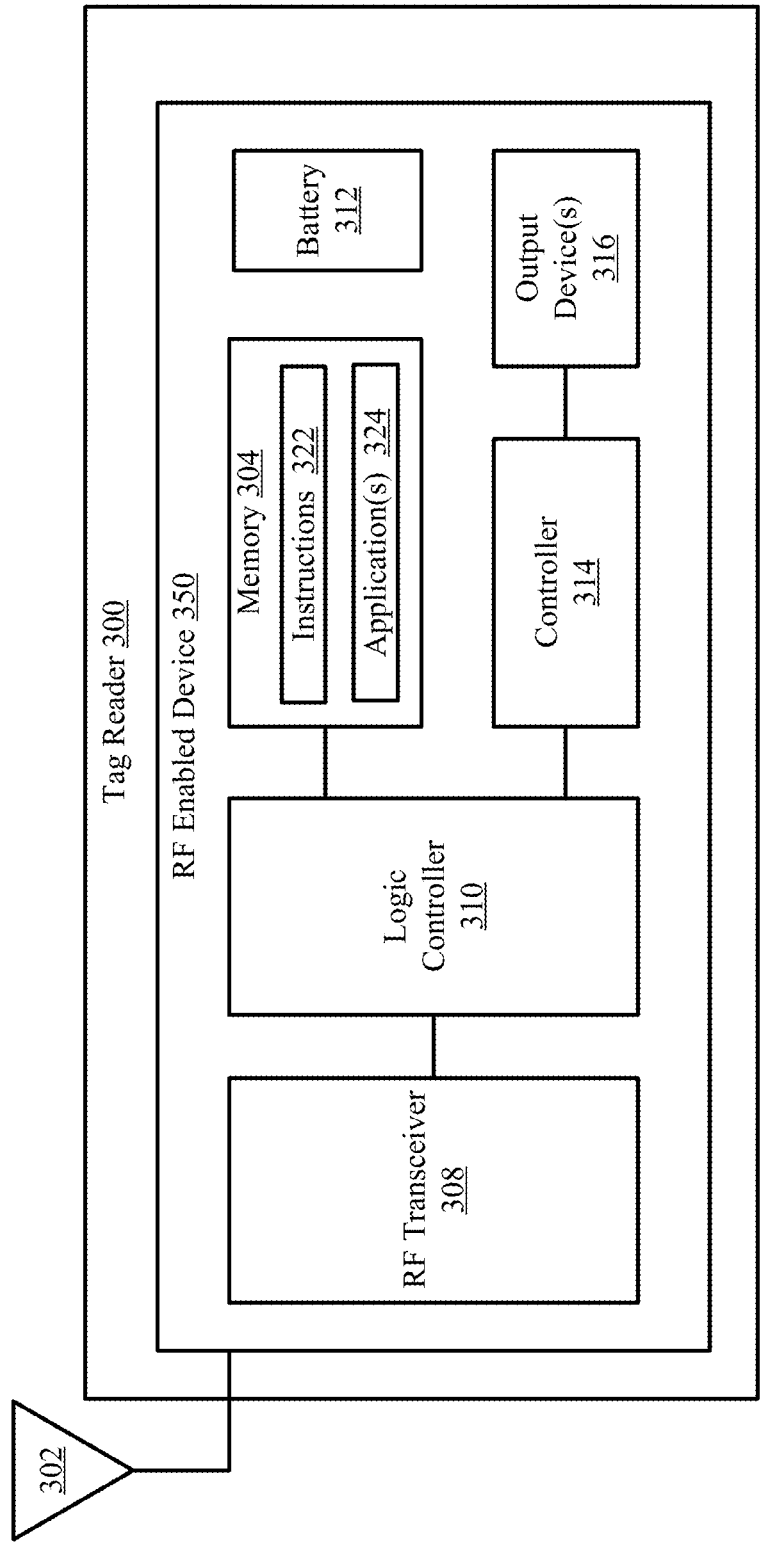
FIG. 3 is an illustration of an illustrative architecture for a tag reader.

Referring now to FIG. 3, there is provided a detailed block diagram of an exemplary architecture for a tag reader 300. Tag reader 120 of FIG. 1 is the same as or similar to tag reader 300. As such, the discussion of tag reader 300 is sufficient for understanding tag reader 120.

Tag reader 300 may include more or less components than that shown in FIG. 3. However, the components shown are sufficient to disclose an illustrative embodiment implementing the present solution. Some or all of the components of the tag reader 300 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an illustration of a representative tag reader 300 configured to facilitate improved inventory counts and management within an RSF (e.g., RSF 128 of FIG. 1). In this regard, the tag reader 300 comprises an RF enabled device 350 for allowing data to be exchanged with an external device (e.g., RFID tags $112_1, \ldots, 112_N, 118_1, \ldots, 118_X$ of FIG. 1) via RF technology. The components 304-316 shown in FIG. 3 may be collectively referred to herein as the RF enabled device 350, and may include a power source 312 (e.g., a battery) or be connected to an external power source (e.g., an AC mains).

The RF enabled device 350 comprises an antenna 302 for allowing data to be exchanged with the external device via RF technology (e.g., RFID technology or other RF based technology). The external device may comprise RFID tags $112_1, \ldots, 112_N, 118_1, \ldots, 118_X$ of FIG. 1. In this case, the antenna 302 is configured to transmit RF carrier signals (e.g., interrogation signals) to the listed external devices, and/or transmit data response signals (e.g., authentication reply signals) generated by the RF enabled device 350. In this regard, the RF enabled device 350 comprises an RF transceiver 308. RF transceivers are well known in the art, and therefore will not be described herein. However, it should be understood that the RF transceiver 308 receives RF signals including information from the transmitting device, and forwards the same to a logic controller 310 for extracting the information therefrom.

The extracted information can be used to determine the presence, location and/or type of movement of an RFID tag within a facility (e.g., RSF 128 of FIG. 1). Accordingly, the logic controller 310 can store the extracted information in memory 304, and execute algorithms using the extracted information. For example, the logic controller 310 can correlate tag reads with beacon reads to determine the location of the RFID tags within the facility. The logic controller 310 can also perform pattern recognition operations using sensor data received from RFID tags and comparison operations between recognized patterns and pre-stored patterns. The logic controller 310 can further select a time slot from a plurality of time slots based on a tag's unique identifier (e.g., an EPC), and communicate information specifying the selected time slot to the respective RFID tag. The logic controller 310 may additionally determine a WOT during which a given RFID tag's communication device (e.g., transceiver) or operations(s) is/are to be turned on when motion is detected thereby, and communicate the same to the given RFID tag. The WOT can be determined based on environmental conditions (e.g., temperature, time of day, etc.) and/or system conditions (e.g., amount of traffic, interference occurrences, etc.). Other operations performed by the logic controller 310 will be apparent from the following discussion.

Notably, memory 304 may be a volatile memory and/or a non-volatile memory. For example, the memory 304 can include, but is not limited to, a ferroelectric random access memory (FRAM), a random access memory (RAM), a dynamic random access memory (DRAM), a static random access memory (SRAM), a read only memory (ROM), and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the RF enabled device 350 and that cause the RF enabled device 350 to perform any one or more of the methodologies of the present disclosure. The instructions 322 are generally operative to facilitate determinations as to whether or not RFID tags are present within a facility, where the RFID tags are located within a facility, and/or which RFID tags are in motion at any given time. Other functions of the RF enabled device 350 will become apparent as the discussion progresses.

Figure 4:
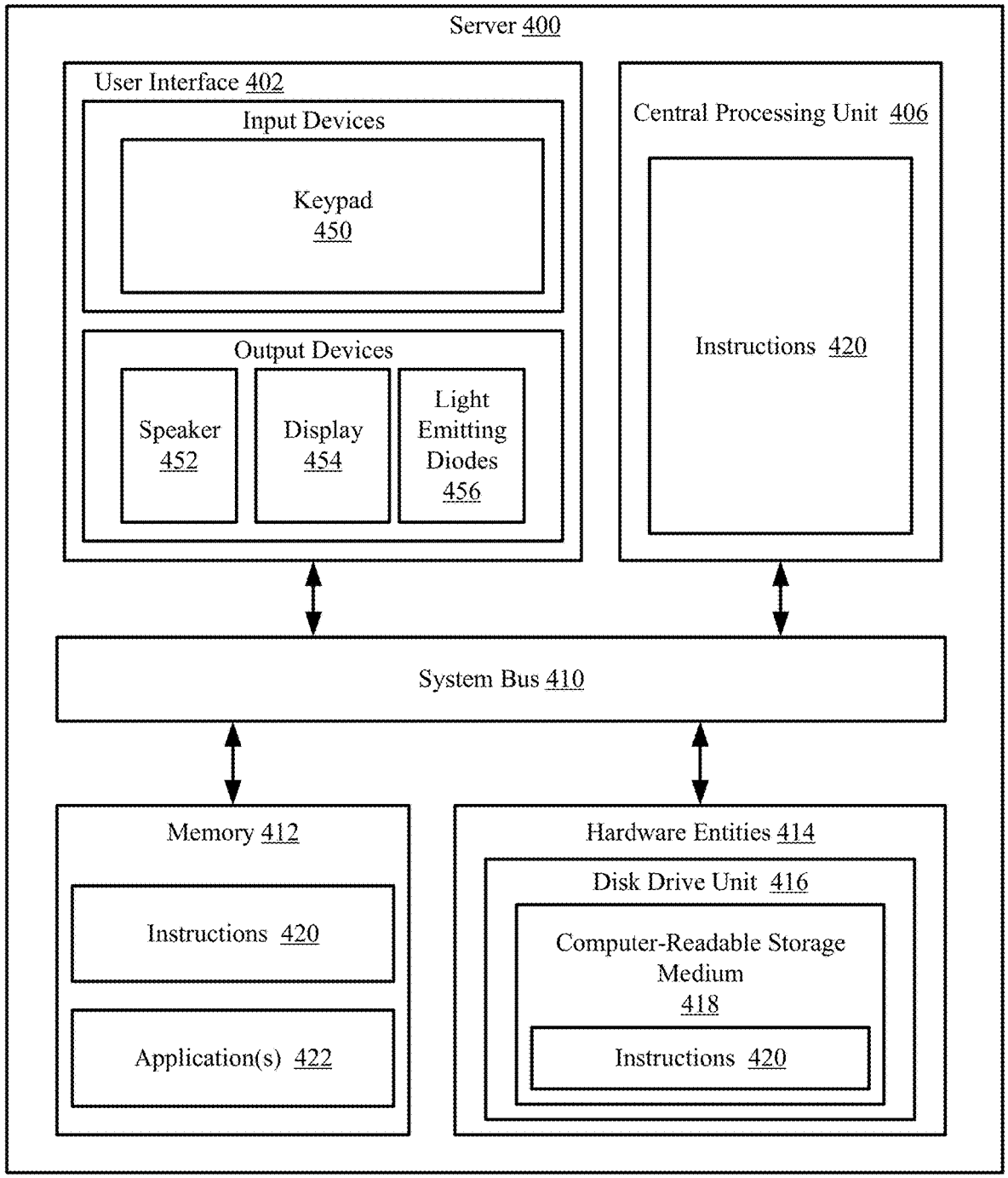
FIG. 4 is an illustration of an illustrative architecture for a server.

Referring now to FIG. 4, there is provided a detailed block diagram of an exemplary architecture for a server 400. Server 124 of FIG. 1 is the same as or substantially similar to server 400. As such, the following discussion of server 400 is sufficient for understanding server 124.

Notably, the server 400 may include more or less components than those shown in FIG. 4. However, the components shown are sufficient to disclose an illustrative embodiment implementing the present solution. The hardware architecture of FIG. 4 represents one embodiment of a representative server configured to facilitate inventory counts and management. As such, the server 400 of FIG. 4 implements at least a portion of a method for determining inventory using time slotted tag communications in accordance with the present solution.

Some or all the components of the server 400 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the server 400 comprises a user interface 402, a CPU 406, a system bus 410, a memory 412 connected to and accessible by other portions of server 400 through system bus 410, and hardware entities 414 connected to system bus 410. The user interface can include input devices (e.g., a keypad 450) and output devices (e.g., speaker 452, a display 454, and/or light emitting diodes 456), which facilitate user-software interactions for controlling operations of the server 400.

At least some of the hardware entities 414 perform actions involving access to and use of memory 412, which can be a RAM, a disk driver and/or a Compact Disc Read Only Memory ("CD-ROM"). Hardware entities 414 can include a disk drive unit 416 comprising a computer-readable storage medium 418 on which is stored one or more sets of instructions 420 (e.g., software code) configured to implement one or more of the methodologies, procedures, or functions described herein. The instructions 420 can also reside, completely or at least partially, within the memory 412 and/or within the CPU 406 during execution thereof by the server 400. The memory 412 and the CPU 406 also can constitute machine-readable media. The term "machine-readable media", as used here, refers to a single medium or multiple media (e.g., a centralized or distributed database, and/or associated caches and servers) that store the one or more sets of instructions 420. The term "machine-readable media", as used here, also refers to any medium that is capable of storing, encoding or carrying a set of instructions 420 for execution by the server 400 and that cause the server 400 to perform any one or more of the methodologies of the present disclosure.

In some scenarios, the hardware entities 414 include an electronic circuit (e.g., a processor) programmed for facilitating the provision of a three-dimensional map showing locations of RFID tags within a facility and/or changes to said locations in near real-time. In this regard, it should be understood that the electronic circuit can access and run a software application 422 installed on the server 400. The software application 422 is generally operative to facilitate: the determination of RFID tag locations within a facility; the direction of travel of RFID tags in motion; and the mapping of the RFID tag locations and movements in a virtual three dimensional space. Other functions of the software application 422 will become apparent as the discussion progresses. Such other functions can relate to tag reader control and/or tag control.

Figure 6:
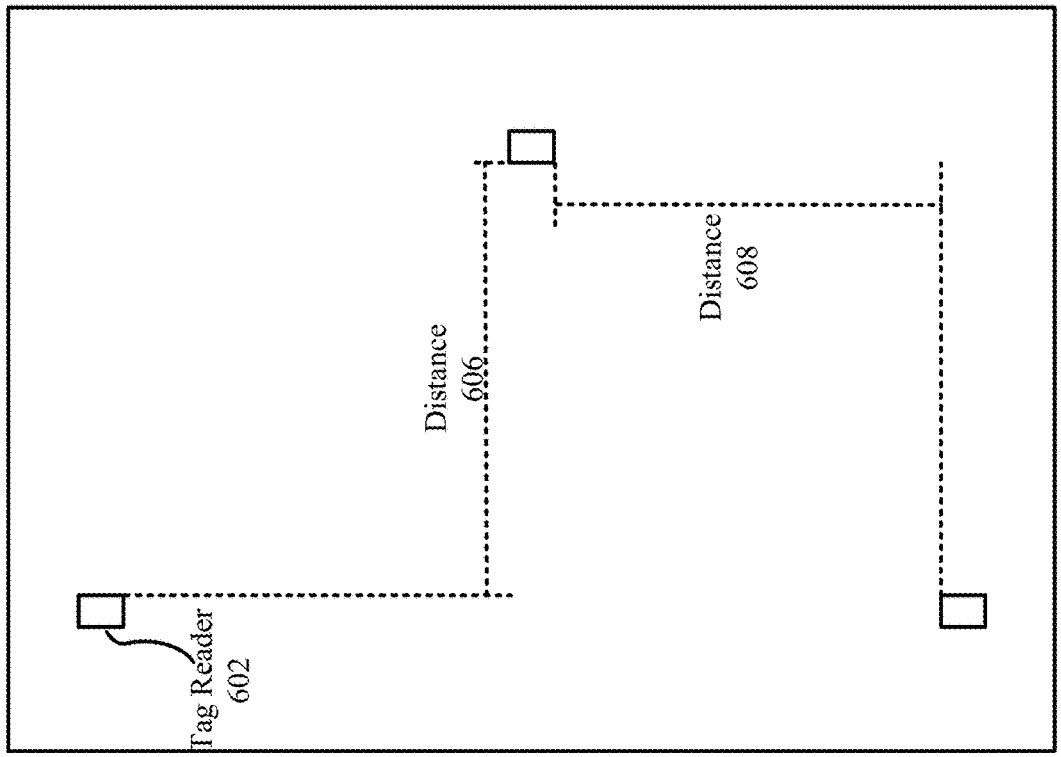
FIG. 6 is an illustration of another illustrative tag reader configuration.
Figure 5:
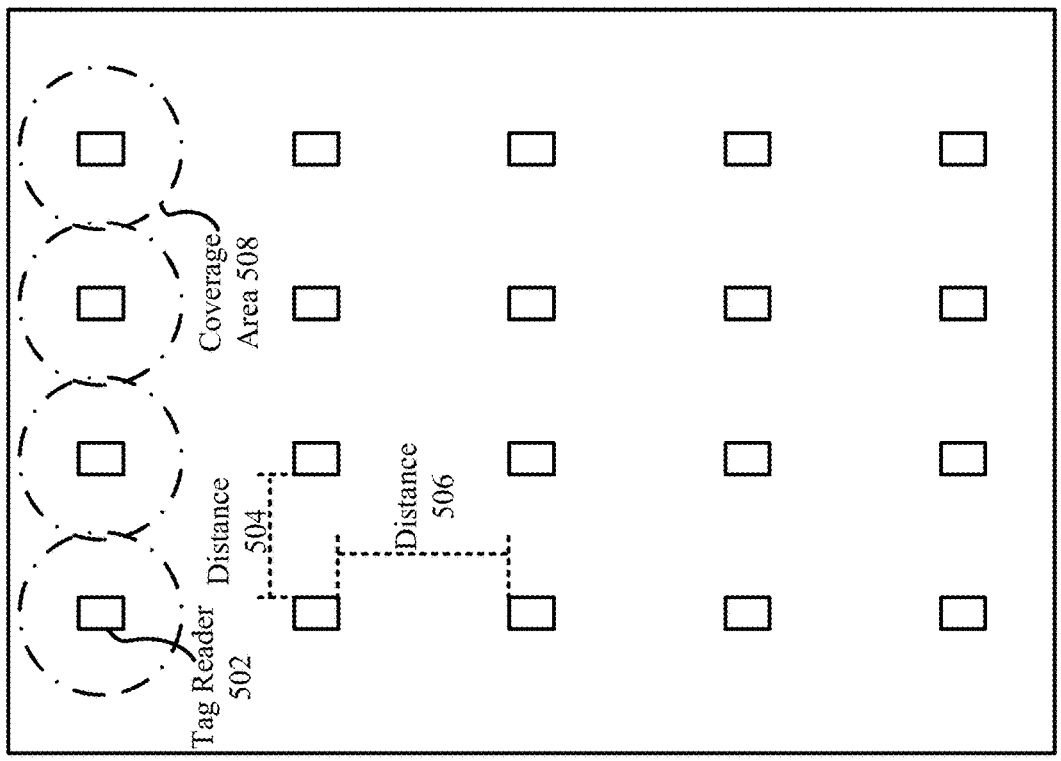
FIG. 5 is an illustration of an illustrative tag reader configuration.

Referring now to FIGS. 5-6, there are provided illustrations that are useful for understanding certain advantages of the present solution. As noted above, the present solution provides RFID tags which can be read by a tag reader located farther away therefrom as compared to that of conventional systems. FIG. 5 shows a tag reader layout for a conventional system. In FIG. 5, there are 20 tag readers 502 with overlapping coverage areas 508. The distance 504, 506 between adjacent tag readers is relatively small (e.g., 9-15 feet apart). In contrast, FIG. 6 shows a tag reader layout for a system implementing the present solution. In FIG. 6, there are advantageously a significantly smaller number of tag readers 602 needed to cover the same area. Accordingly, the distances 606, 608 (e.g., 90-150 feet apart) between adjacent tag readers 602 is much greater than the distances 504, 506 of FIG. 5. Consequently, the present solution has a less resource intensive and less costly infrastructure.

Illustrative Methods for Locating an RF Enabled-Device in a Facility

Figure 7A:
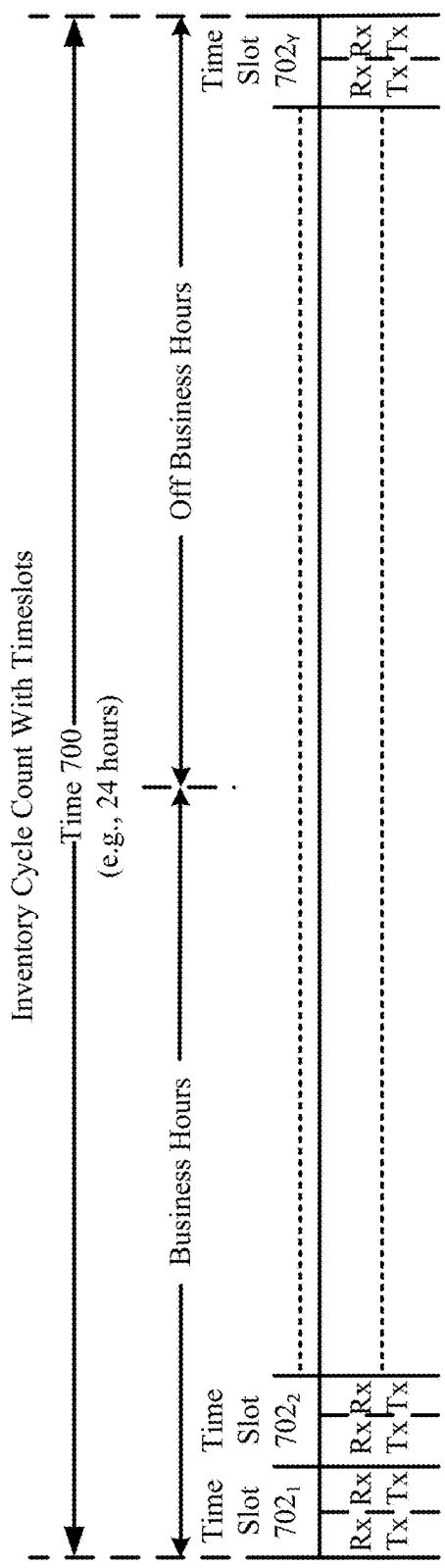
FIGS. 7A-7B (collectively referred to herein as "FIG. 7") provide illustrations that are useful for understanding an inventory cycle count using time slots for communications between tag readers and tags.

Referring now to FIG. 7, there are provided illustrations that are useful for understanding methods for determining inventory using time slotted tag communications. As shown in FIG. 7A, a period of time 700 (e.g., a 24 hour period) is segmented into a plurality of time slots $702_1, 702_2, \ldots, 702_Y$ having equal lengths (e.g., 1 second). During each time slot, at least one RFID tag (e.g., RFID tag $112_1$ of FIG. 1) (A) receives ("Rx") an interrogation signal transmitted from a tag reader (e.g., tag reader 120 of FIG. 1) and (B) transmits ("Tx") a response signal.

Figure 7B:
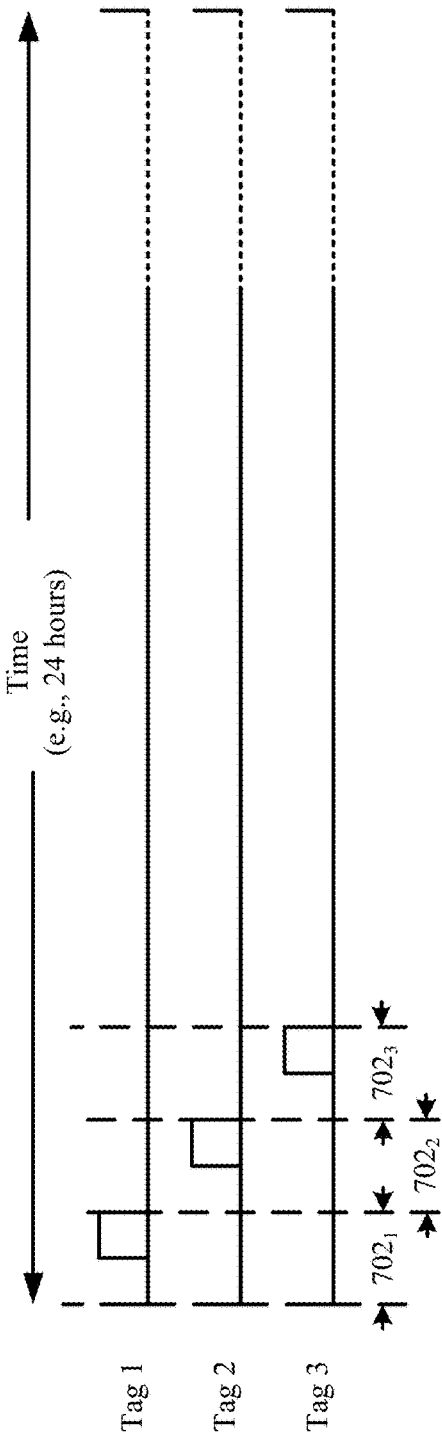

In some scenarios such as that shown in FIG. 7B, a single RFID tag is assigned to each time slot. For example, a first RFID tag is assigned to the first time slot $702_1$. A second RFID tag is assigned to a second time slot $702_2$. A third RFID tag is assigned to a third time slot $702_3$. This time slot assignment can be performed in accordance with a chaotic, random or pseudo-random number algorithm. Alternatively, the time slot assignment can be determined based on the unique codes of the tags (e.g., EPCs, Cyclic Redundancy Check ("CRC") codes, hash codes or outputs of randomizing algorithms). The time slot assignment can be performed by the RFID tags (e.g., RFID tags $112_1, \ldots, 112_N$, $118_1, \ldots, 118_X$ of FIG. 1), tag readers (e.g., tag reader(s) 120 of FIG. 1), and/or a remote server (e.g., server 124 of FIG. 1).

In some scenarios, the time slot allocations can be dynamically changed during system operations. For example, a relatively large number of tag read collisions are occurring in the system (e.g., system 100 of FIG. 1). Accordingly, the time slot allocations are changed so as to minimize such tag read collisions. The manner in which time slots are re-allocated can be determined by a single device (e.g., server 124 of FIG. 1) or by a plurality of devices (e.g., RFID tags $112_1, \ldots, 112_N$, $118_1, \ldots, 118_X$, tag readers 120 and/or server 124 of FIG. 1).

Figure 8:
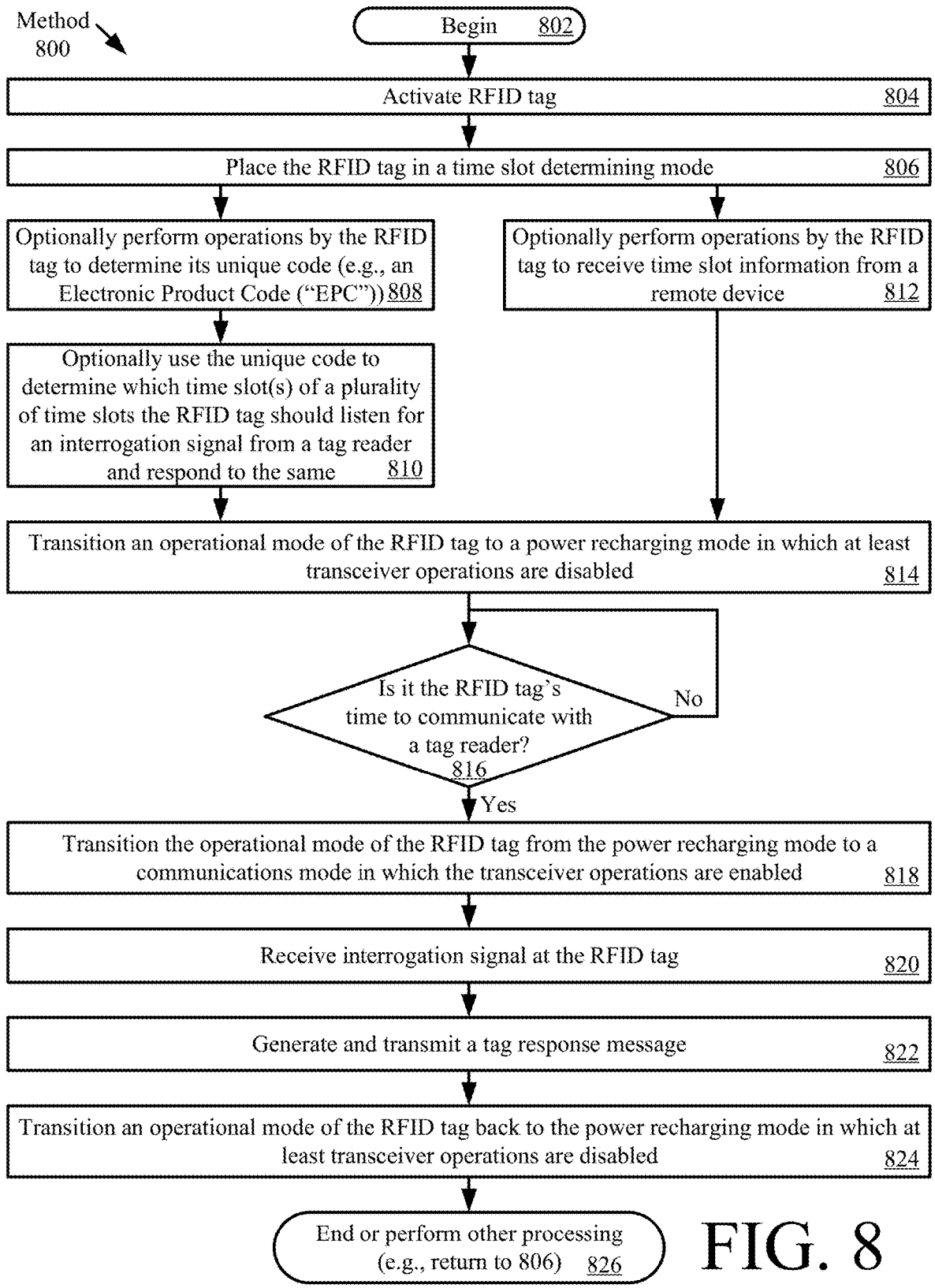
FIG. 8 is a flow diagram of an illustrative method for an inventory cycle count using time slots for communications between tag readers and tags.

Referring now to FIG. 8, there is a flow diagram of an illustrative method 800 for determining an inventory using a time slotted communications scheme such as that shown in FIGS. 7A-7B. Method 800 begins with 802 and continues with 804-806 where an RFID tag (e.g., RFID tags $112_1, \ldots, 112_N$, $118_1, \ldots,$ or $118_X$ of FIG. 1) is activated and placed in a time slot determining mode.

In the time slot determining mode, the RFID tag is assigned to a time slot (e.g., time slot $702_1$ of FIG. 7) of a plurality of time slots (e.g., time slots $702_1, 702_2, \ldots, 702_Y$ of FIG. 7). This is achieved through (I) operations performed by the RFID tag and/or (II) operations performed by a remote device (e.g., tag reader 120 of FIG. 1 or server 124 of FIG. 1).

In the first case (I), operations 808-810 are performed by the RFID tag. These operations involve: determining the RFID tag's unique code (e.g., unique ID 224 of FIG. 2); and using the unique code to determine which time slot(s) the RFID tag should listen for an interrogation signal from a tag reader and respond to the same. In this regard, the RFID tag can be programmed with an algorithm for translating the unique code to a time slot value or with a look-up table indicating a mapping of unique codes to time slot values. The translation can be achieved by using the unique code as an input to a pre-defined algorithm to compute a time slot value.

In the second case (II), operations are performed by the remote device(s). These operations involve: selectively assigning at least one time slot to the RFID tag; and communicating information identifying the selectively assigned time slot(s) to the RFID tag. The time slot assignment can be based on a chaotic/random/pseudo-random algorithm and/or in accordance with a unique code-to-time slot translation or mapping scheme. Accordingly, FIG. 8 includes optional block 812 where the RFID tag receives time slot information from a remote device.

Upon completing 810 or 812, method 800 continues with 814 where an operational mode of the RFID tag is transitioned from the time slot determining mode to a power recharging mode. In some scenarios, the operational state or mode change is achieved by changing the binary value of at least one state or mode bit (e.g., from 0 to 1, or vice versa) for causing certain communication control operations to be performed by the RFID tag. Additionally or alternatively, a switch can be actuated for creating a closed or open circuit. The present solution is not limited in this regard.

In the power recharging mode, a rechargeable power source (e.g., power source 236 of FIG. 2) is recharged using energy (e.g., RF energy) harvested by an energy harvesting circuit (e.g., energy harvesting circuit 232 of FIG. 2) of the RFID tag. Notably, at least one communication operation and/or the RFID tag's communication device (e.g., transceiver 206 of FIG. 2) is disabled or bypassed in the power recharging mode. Other functions/operations of the RFID tag may also be disabled in this mode for power conservation purposes.

Next, a decision is made as to whether it is time for the RFID tag to communicate with a tag reader. This decision can be achieved using knowledge of the time slots(s) assigned to the particular tag. If it is not the RFID tag's time to communicate with a tag reader [816: NO], then method 800 returns to 816. In contrast, if it is the RFID tag's time to communicate with a tag reader [816: YES], then method 800 continues with 818 where the operational mode of the RFID tag is transitioned from the power recharging mode to a communications mode in which at least one communications operations and/or communication device (e.g., the transceiver) is enabled and/or no longer bypassed. Thereafter in 820, an interrogation signal is received at the RFID tag. Interrogation signals are well known in the art, and therefore will not be described herein. In response to the interrogation signal, the RFID tag generates and transmits a tag response message, as shown by 822. Tag response messages are well known in the art, and therefore will not be described herein. Still, it should be noted that the tag response message can include the RFID tag's unique identifier (e.g., unique identifier 224 of FIG. 2) therein. The present solution is not limited to the particulars of 820-822. For example, a number of iterations of communications operations (e.g., transmit and receive operations) can be performed prior to continuing to 824.

Next in 824, the operational mode of the RFID tag is transitioned back to the power recharging mode in which at least communications operations and/or communication device (e.g., the transceiver) is/are disabled and/or bypassed. Subsequently, 826 is performed where method 800 ends or other processing is performed (e.g., return to 806).

The method 800 described above provides a solution to real time inventory, but does not include a way to detect changes to inventory due to removal of RFID tags from an RSF (e.g., RSF 128 of FIG. 1) between respective adjacent time slots (e.g., because of sale or theft). Accordingly, method 800 can be modified to include additional operations for detecting and accounting for tag movement at all times during an inventorying process. Such a modified method is discussed below in relation to FIGS. 9-13.

Figure 9:
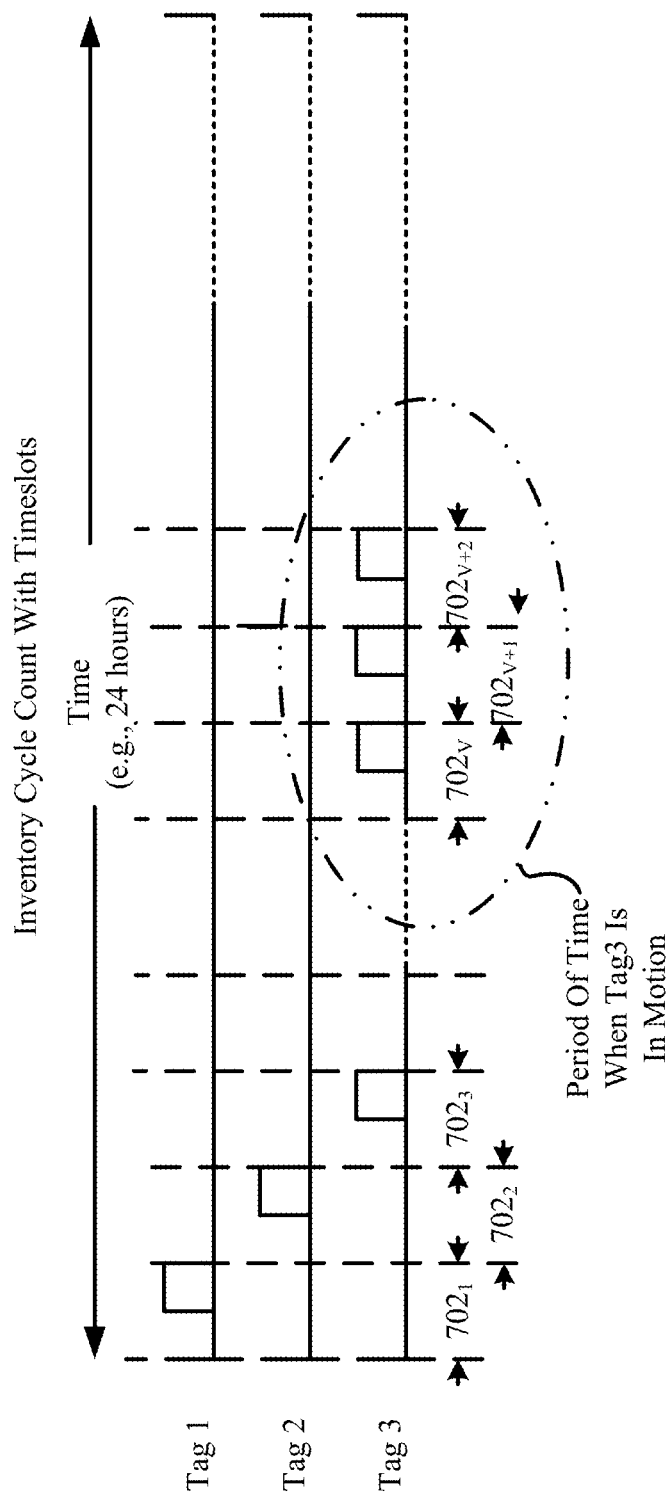
FIG. 9 is an illustration that is useful for understanding an inventory cycle count in which (a) time slots are used for communications between tag readers and tags and (b) a detection of tag motion causes communication enablement.

Referring now to FIG. 9, there is provided an illustration that is useful for understanding methods for determining inventory using motion triggered time slotted tag communications. As shown in FIG. 9, the third tag performs communications (e.g., transceiver) operations in time slots $702_V$, $702_{V+1}$, $702_{V+2}$ in addition to its assigned time slot $702_3$. These time slots $702_V$, $702_{V+1}$, $702_{V+2}$ occur during a period of time when the third tag is in motion. This allows tag readers to see moving RFID tags quickly, as well as helps at a Point Of Sale ("POS") and to determine whether the RFID tags were moved into a high risk area (e.g., a fitting room or bathroom).

Referring now to FIGS. 10-11, there are provided illustrations that are useful in understanding the contents of tag response messages. In some scenarios, the tag response message 1000 includes only a unique tag identifier 1002 (e.g., unique ID 224 of FIG. 2). In other scenarios, the tag response message 1100 includes a motion indicator 1104 in addition to the unique tag identifier 1102. The motion indicator 1104 indicates whether the tag is currently in motion, is in a given operational state/mode, and/or has a given motion sensor state.

Figure 12A:
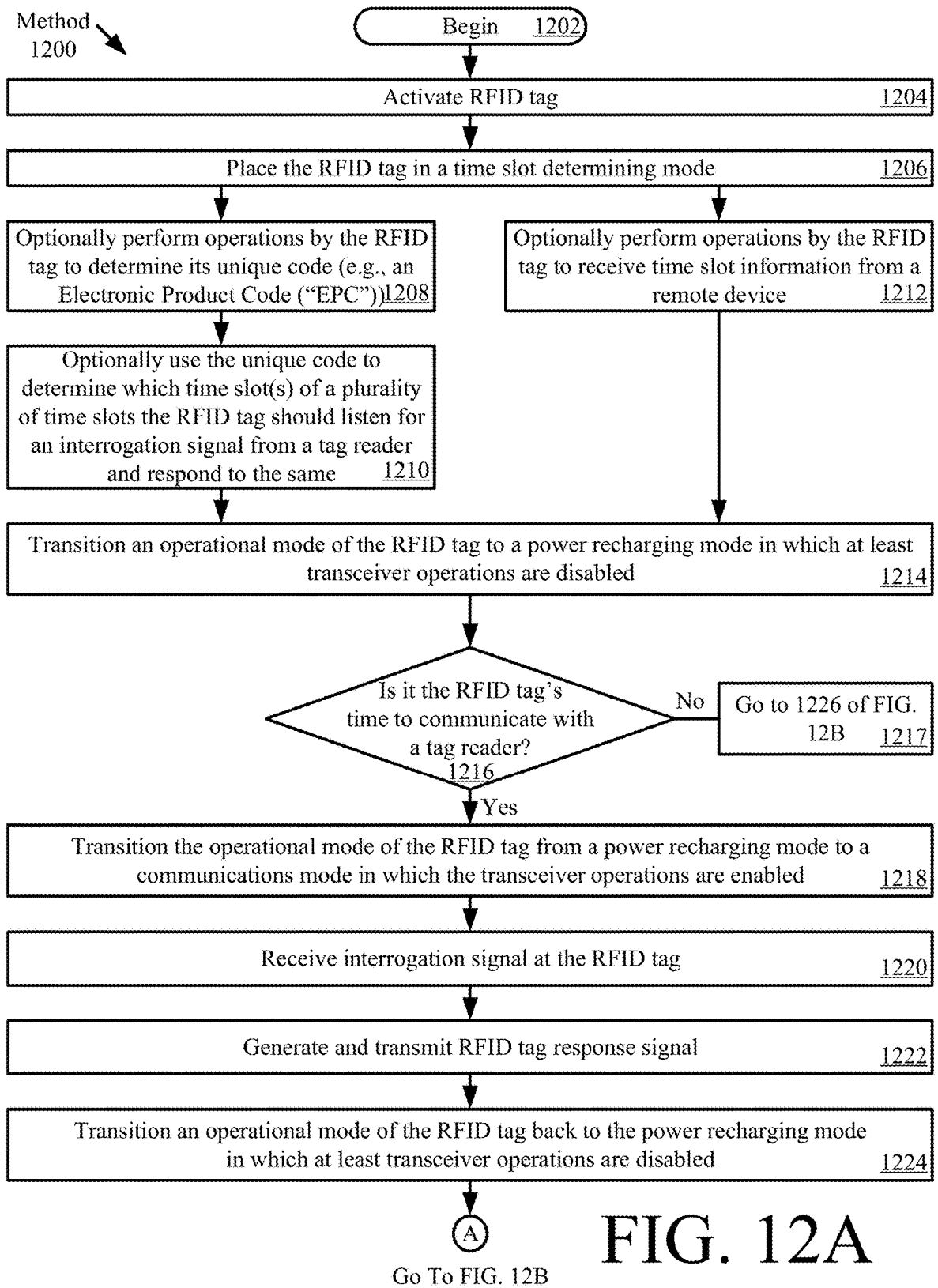
FIGS. 12A-12B (collectively referred to herein as "FIG. 12") provide a flow diagram of an illustrative method for an inventory cycle count.
Figure 12B:
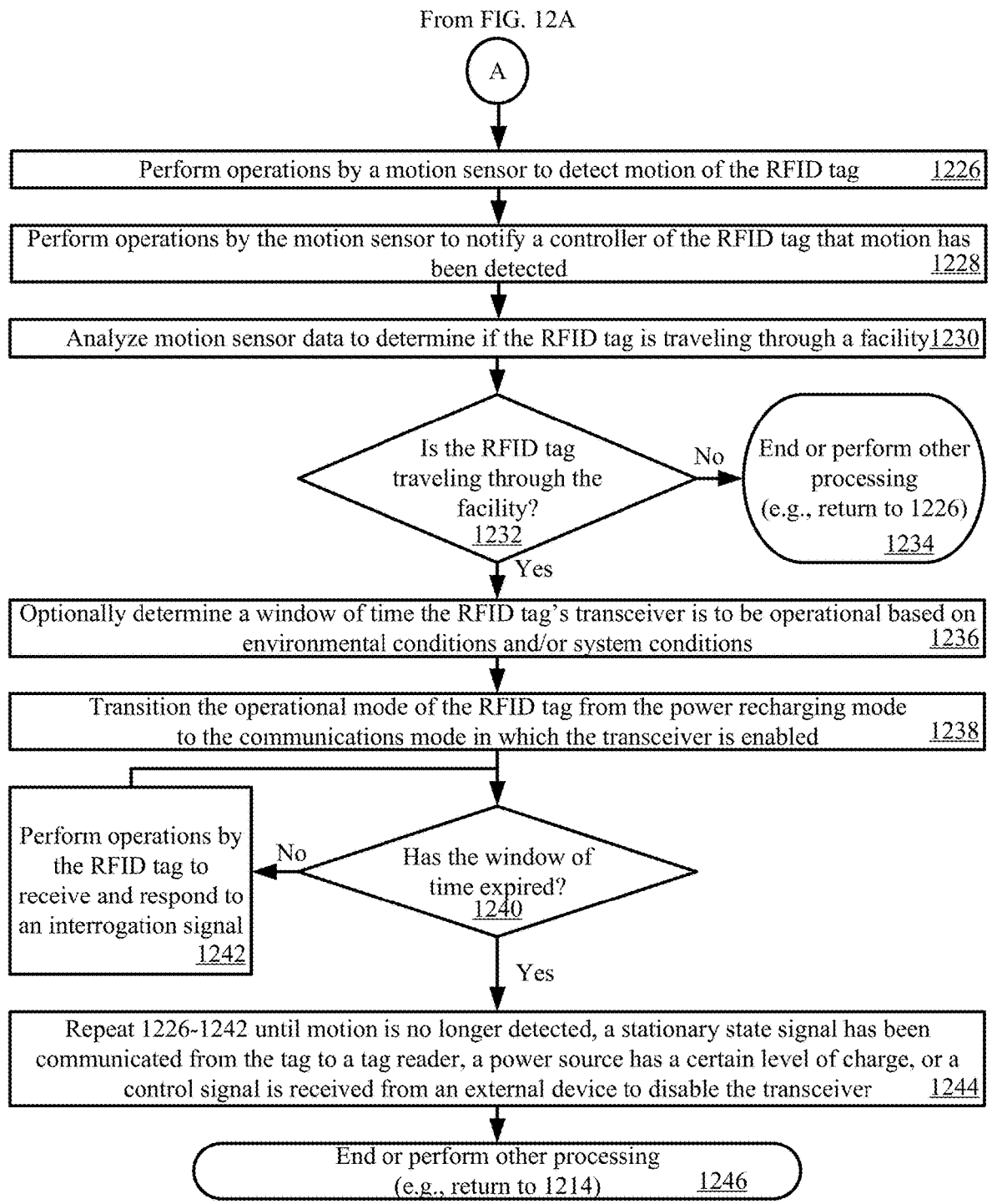

Referring now to FIG. 12, there is provided a flow diagram of an illustrative method 1200 for determining inventory using time slotted tag communications. Method 1200 begins with 1202 and continues with 1204-1224. 1204-1224 are the same as or substantially similar to 804-824 of FIG. 8. The above discussion of 804-824 is sufficient for understanding 1204-1224. Notably, a new block 1217 is provided in which method 800 continues to 1226 of FIG. 12B when a determination is made in 1216 that it is not the RFID tag's time to communicate with the tag reader.

Upon completing 1224, method 1200 continues with 1226 of FIG. 12B. As shown in FIG. 12B, 1226 involves performing operations by a motion sensor (e.g., motion sensor 250 of FIG. 2) to detect motion of the RFID tag (e.g., RFID tag $112_1$, . . . , $112_N$, $118_1$, . . . , or $118_X$ of FIG. 1). Next in 1228, the motion sensor performs operations to notify a controller (e.g., controller 210 of FIG. 2) of the RFID tag that motion has been detected. The motion sensor also provides motion sensor data to the controller. In 1230, the motion sensor data is analyzed to determine if the RFID tag is traveling through a facility. This analysis can be performed by the RFID tag's controller and/or a remote device (e.g., a tag reader or server). The analysis can involve detecting pre-defined patterns of movement specified in the motion sensor data (e.g., a walking pattern, a running pattern, or a vehicle traveling pattern). If a determination is made that the RFID tag is not traveling through a facility (e.g., RSF 128 of FIG. 1) [1232:NO], then 1234 is performed where method 1200 ends or other processing is performed (e.g., return to 1226).

In contrast, if a determination is made that the RFID tag is traveling through a facility [1232:YES], then 1236 is optionally performed where a WOT is determined during which the RFID tag's communication operation(s) and/or communication device (e.g., transceiver) is to be operational, enabled, or no longer bypassed. 1236 is optional since the RFID tag can be pre-programmed with a WOT value. In other scenarios, a value for the WOT is determined by the RFID tag and/or a remote device. The WOT value is determined based on environmental conditions and/or system conditions. Notably, the WOT value is variable. This feature of the present solution allows minimization of the RFID tag's system power, minimizes tag read collisions, and identification of moving RFID tags without reading all static/stationary RFID tags.

Once the RFID tag has knowledge of the WOT value, then 1238 is performed where its operational mode is transitioned from the power recharging mode to the communications mode in which at least one communication operation and/or communication device (e.g., transceiver) is enabled or no longer bypassed. In the communications mode, the RFID tag uses an internal clock/timer (e.g., clock/timer 214 of FIG. 1) to determine if the WOT has expired. If not [1240:NO], then the RFID tag performs operations in 1242 to receive and respond to at least one interrogation signal. In so [1240: YES], then 1226-1242 are repeated until motion is no longer detected, a stationary state signal has been communicated from the tag to a tag reader, a power source (e.g., power source 236 of FIG. 2) has a certain level of charge, and/or a control signal is received from an external device to disable or bypass the communications operations and/or device (e.g., transceiver). Subsequently, 1246 is performed where method 1200 ends or other processing is performed (e.g., return to 1214 of FIG. 12A).

The solution described with respect to FIGS. 1-12 has many advantages. For example, the present solution: solves real time, daily, accurate inventory with a low cost tag reader infrastructure; solves an overhead RFID as EAS problem; is able to accurately track moving tags; identify tags leaving a store even when there are a relatively large number of tags in proximity to the exit; and improves ecommerce processes by providing accurate inventory count and RFID tag locations at all times. The present solution is also greener since it limits the amount of time RF devices are enabled.

The present solution can be used in conjunction with other sensors, such as proximity sensors. For example, if proximity sensors detect the presence of individuals in the facility, then the stationary tag readers can be temporarily disabled (e.g., until there are no more people in the facility).

The RFID tags of the present solution are relatively small with good read range. This allows the RFID tags to be added to animals (e.g., humans, pets, etc.). In this case, the RFID tags can be configured to have enabled communication operations and/or devices (e.g., transceivers) only during times of detected movement thereof. The RFID tags could also be placed on wearable items (e.g., hats, belts, etc.) in a manner that does not interfere with the wearing humans.

Turning now to FIG. 13, there is presented a flowchart depicting a method 1300 which is useful for understanding how features A, B, C and D can be used in one or more combinations to achieve further advantages. The process begins at 1302 and continues at 1306 where a determination is made as to whether a tag motion sensor (e.g., motion sensor 250 of FIG. 2) has detected that a tag (e.g., RFID tag 112$_1$, . . . , 112$_N$, 118$_1$, . . . , or 118$_N$ of FIG. 1) is in motion.

If no tag motion is detected [1306:NO], then method 1300 continues with 1310 where a tag communication interrupt control system periodically enables tag communications with a tag reader (e.g., tag reader 120 of FIG. 1), whereby the tag attempts to communicate with the tag reader in accordance with its predetermined communication schedule. This scheduled communication process can be one that is similar to that described herein with respect to FIG. 12. At 1312, the tag updates a communication log stored in its memory (e.g., memory 208 of FIG. 2). The power management log can contain stored information indicating whether each scheduled attempt to communicate with the tag reader was a success or failure. 1312 can also involve determining a communication index value, such as a rate of successful communication Rsc for some amount of time preceding the determination (e.g., a communication success rate over the past 12 hours). Rsc comprises (A) a measure of a number of successful communications in a pre-defined period of time, (B) a measure of the number of unsuccessful communications in the pre-defined period of time, and/or (C) a ratio of measures (A) and (B). Measures (A) and (B) can be obtained using one or more counters which are incremented in response to the reception of a signal or the lack of reception of a signal in one or more timeslots.

At 1314, the tag checks on the status of battery charge and/or energy harvesting efforts. 1314 can involve reading, measuring or accessing information from one or more of an energy harvesting circuit (e.g., energy harvesting circuit 232 of FIG. 2), power management circuit (e.g., power management circuit 234 of FIG. 2), and/or power source (e.g., power source 236 of FIG. 2). At 1316, this information is used to update a power management log stored in memory (e.g., memory 208 of FIG. 2). The power management log can contain stored information specifying or recording the information acquired in 1314. 1314 can also involve determining a power management index value PM based on one or more elements comprising such information. PM comprises a measure of a battery level at a given time, a measure of a rate of energy harvesting (e.g., a rate at which a capacitor is being charged or discharged), a measure of rate of charge delivered to an energy storage device in the tag, a measure of the amount of charge in the energy storage device (e.g., a capacitor), a measure of effectiveness of a power harvesting operation, and a power management index value. The power management index value can be determined using a Look Up Table ("LUT"). For example, an index value can be obtained from the LUT that is associated with a given power level of an energy storage device (e.g., battery or capacitor). The present solution is not limited to the particulars of this example.

The Rsc and PM values are transmitted to the tag reader 1317 at the next opportunity (e.g., during the next scheduled transmit cycle). Alternatively or in addition to these regularly scheduled transmissions, such information is transmitted to the tag reader under certain alert conditions which are discussed below.

At 1318, a determination is made as to whether the Rsc value (or communication success rate) has fallen below a predetermined threshold value Tsc (e.g., 3 indicating three consecutive communication attempt failures in one day) which has been established as a minimum acceptable level of communication success. For example, if the Rsc value is less than the predetermined threshold value Tsc, then this condition can be used as an indication that a satisfactory level of communication success is not being achieved by the tag. In that case [1318:YES], method 1300 continues with 1352 in FIG. 13C. Otherwise [1318:NO], method 1300 continues with 1322 which will be discussed below.

Figure 13A:
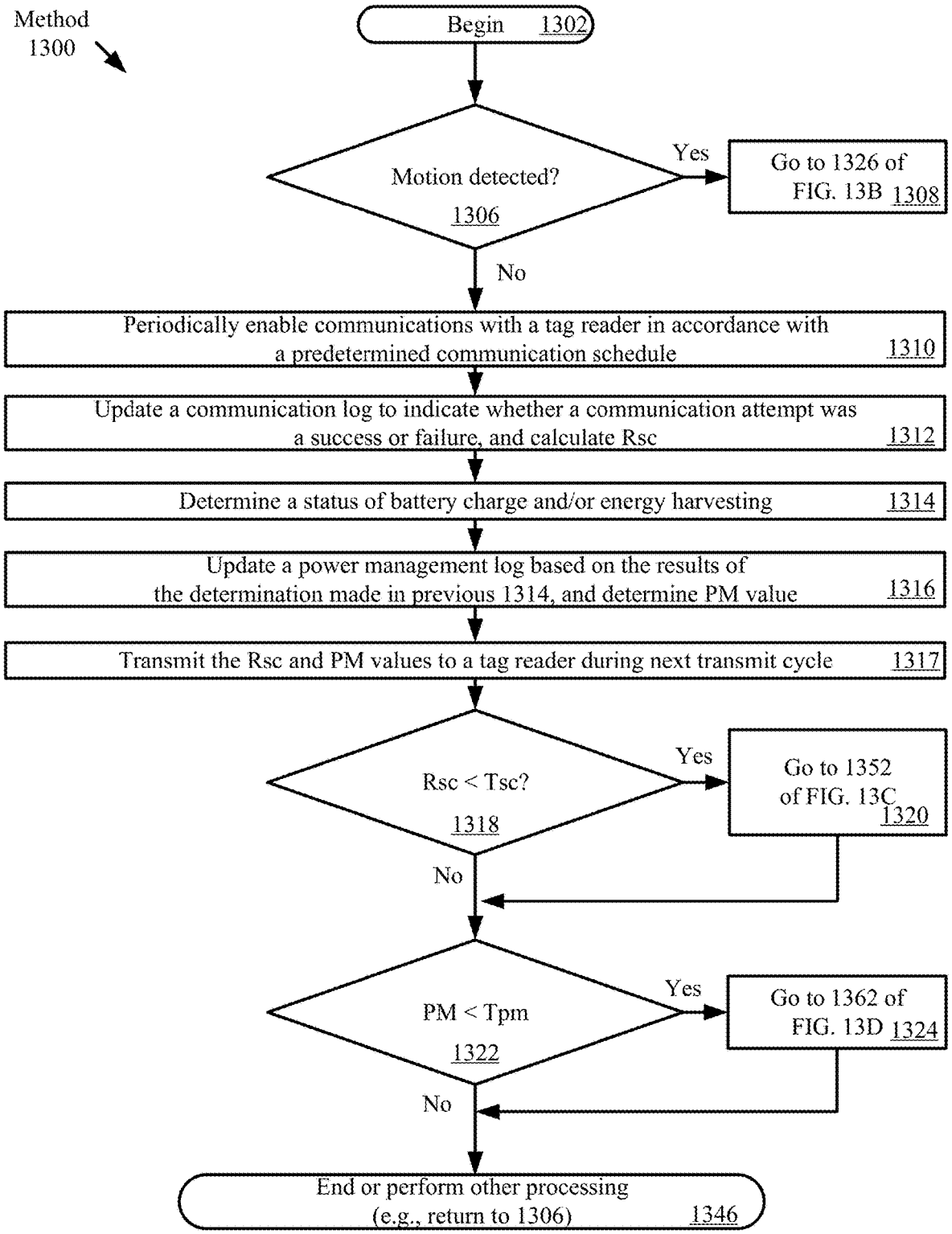
FIGS. 13A-13D (collectively referred to herein as "FIG. 13") provide a flow diagram of an illustrative method for a conditional tag alerting process.
Figure 13B:
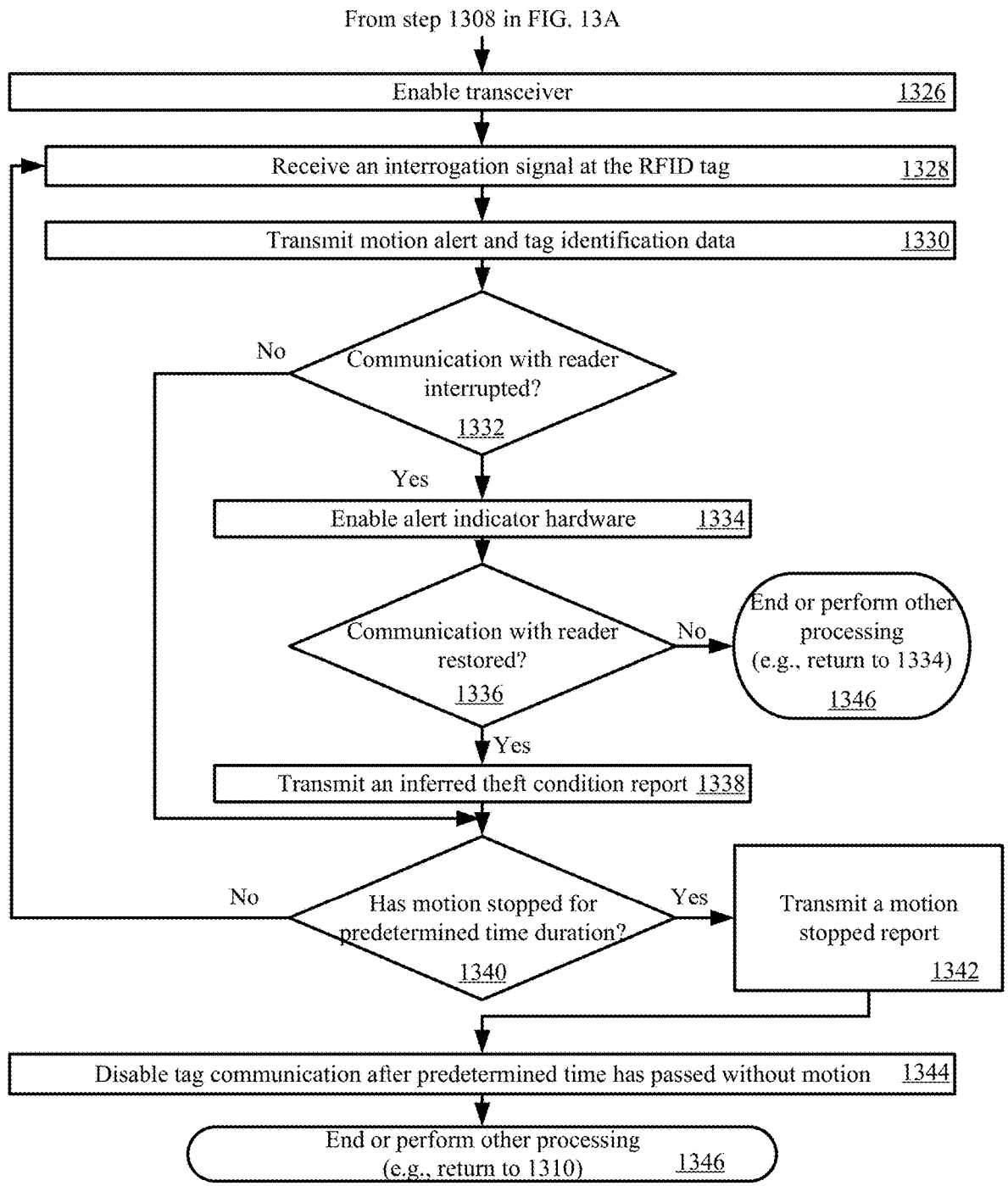
Figure 13C:
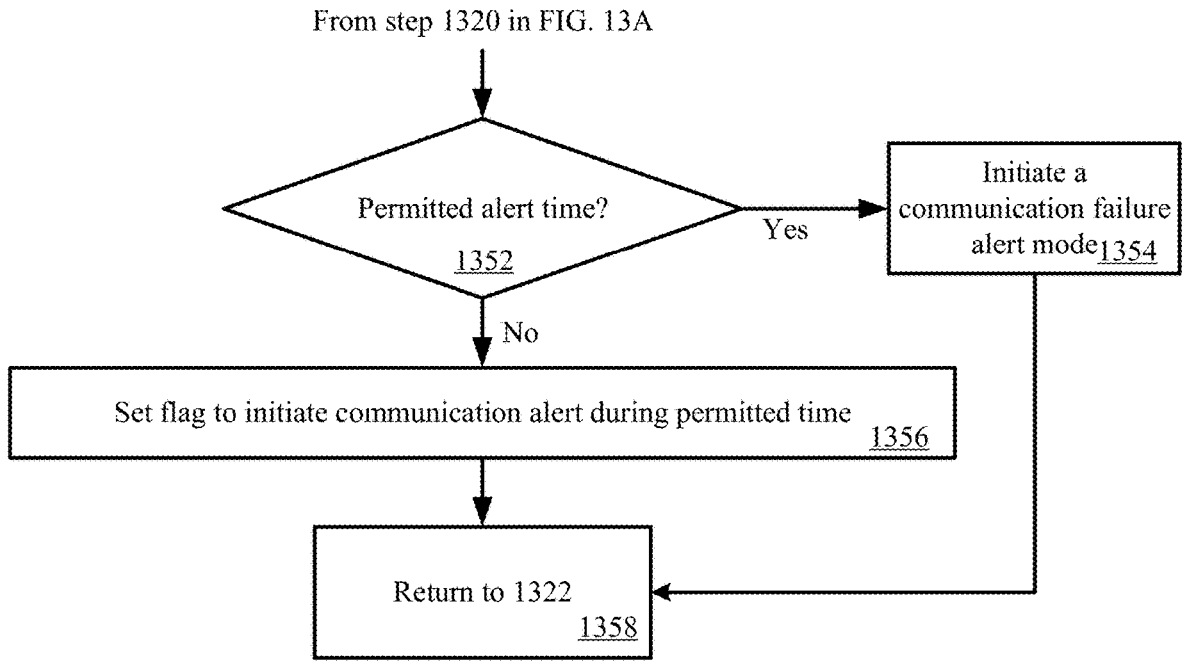

As shown in FIG. 13C, 1352 involves making a determination as to whether the current time of day is one during which human perceptible alerts are to be sounded within a particular facility. For example, in a retail store scenario, it can be desirable to limit the alerts to periods when the store is quiet and/or when few customers are likely to be in the store. If the current time is a permitted alert time [1352:YES], then the tag initiates a communication failure alert mode as shown by 1354. Subsequently, 1358 is performed where method 1300 returns to 1322 of FIG. 13A. Otherwise [1352:NO], a flag is set in 1356 to initiate communication alert during permitted time. Next in 1358, method 1300 returns to 1322 of FIG. 13A.

The communication alert mode can involve various actions which are intended to facilitate improved communications between the tag and the reader. For example, in some scenarios, the alert mode can involve increasing the number of time slots during which the tag will attempt to communicate with the reader. As an alternative or in addition, the alert mode initiated at 1354 can involve activating or enabling one or more components of the alert indicator module to generate a human perceptible alert. Employees or technicians at the facility can then know that the tag needs to be moved into an area which is more conducive to communications. This can involve a relatively simple process where the person listens or looks for an alerting tag, and upon locating same moves the tag to a different location for improved communications (or adjusts a reader system to more effectively communicate with the tags in a particular zone). After doing so, the person can manually reset the communication failure alert (e.g., by means of a reset switch located on the body of the tag).

If the current time is not a permitted alert time [1352:NO], then the tag can set a flag in 1356 so that the communication failure alert will be initiated at a later time when alerts are permitted. Thereafter, 1358 is performed where method 1300 returns to step 1322 in FIG. 13A.

As shown in FIG. 13A, a further determination is made in 1322 as to whether PM has fallen below a predetermined threshold value Tpm (e.g., 1 Joules indicating that a battery or capacitor will be fully discharged in one day, or a rate of discharged indicating that the battery or capacitor will be fully discharged in thirty days) which has been established as a minimum acceptable level. For example, if PM is less than a predetermined threshold value Tpm, then this condition can be used as an indication that power levels in the tag are low and/or energy harvesting operations are not proceeding at a rate sufficient to maintain satisfactory tag operation. In that case [1322:YES], 1324 is performed where method 1300 goes to 1362 in FIG. 13D. Otherwise [1322:NO], 1346 is performed where method 1300 ends or other processing is performed (e.g., return to 1306 of FIG. 13A).

Figure 13D:
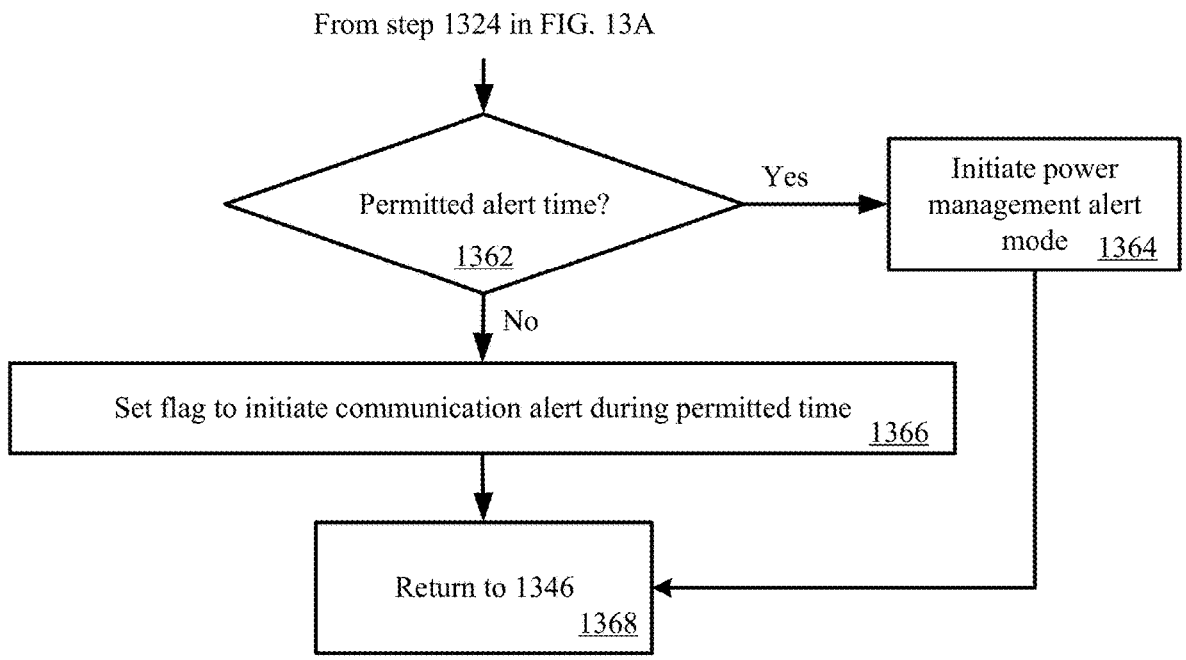

As shown in FIG. 13D, 1362 involves making a determination as to whether the current time of day is one during which human perceptible alerts are to be sounded within a particular facility. If the current time is a permitted alert time [1362:YES], then the tag initiates a power management failure alert mode at 1364. Next 1368 is performed where method 1300 returns to 1346 of FIG. 13B. In 1346, method 1300 ends or other processing is performed (e.g., return to 1310) of FIG. 13A. In contrast if the current time is not a permitted alert time [1362:NO], then a flag is set in 1366 to initiate communication alert during permitted time. Subsequently, 1368 is performed where method 1300 returns to 1346 of FIG. 13B.

The power management failure alert mode of 1364 involves various actions which are intended to result in improved power management at the tag. For example, in some scenarios, the alert mode involves increasing the number of time slots during which the tag will attempt to communicate with the reader so as to more immediately alert a reader that a tag is having power management issues, rather than waiting to the next regularly scheduled communication time. In addition, the alert mode initiated in 1364 can involve activating or enabling one or more components of the alert indicator module to generate a human perceptible alert. Employees or technicians at the facility can then know that the tag needs to be moved into an area of greater energy harvesting (or that more energy needs to be delivered to a particular zone). This can involve a relatively simple process where the person listens or looks for an alerting tag, and upon locating same moves the tag to a different location for improved energy harvesting (or adjusts the amount of energy delivered to a particular zone of a facility for enhanced energy harvesting). After doing so, the person can manually reset the power management alert (e.g., by means of a reset switch located on the body of the tag).

Referring once again to FIG. 13A, when tag motion is detected [1306:YES], then 1308 is performed where method 1300 goes to 1326 of FIG. 13B. As shown in FIG. 13B, 1326 involves performing operations by the tag communication interrupt control system to enable the tag such that it communicates with tag readers. In some scenarios, 1326 can initially involve only powering up a receiver portion of the transceiver with subsequent powering or enabling of the transmitter to follow only after a tag interrogation signal is received from a reader.

In next 1328, the tag waits to receive an interrogation signal (e.g., an interrogation signal from a tag reader 120 of FIG. 1). When the interrogation signal is received, the tag transmits a motion alert (e.g., a motion indicator 1104 of FIG. 11) as part of its tag response message so as to indicate that the tag has been or is being moved, as shown by 1330. At 1332, a determination is made as to whether communication with the tag reader has been interrupted. For example, this determination can be based on a detected interruption in received interrogation signals at the RFID tag.

If no interruption has occurred [1332:NO] and interrogation signals continue to be received, then method 1300 goes to 1340 where the tag checks to determine whether the motion has stopped for a predetermined period of time. If so [1340:YES], then the tag transmits a motion stopped report at 1342. The tag communication interrupt control system then disables further tag communications if a predetermined amount of time has passed without motion, as shown by 1344. For example, in some scenarios, this could involve powering down the tag transceiver to reduce power consumption at the tag. Subsequently, 1346 is performed where method 1300 ends or other processing is performed (e.g., by returning to 1310 of FIG. 13A).

However, if a communication interruption is detected while tag communication capabilities are still enabled [1332:YES], then method 1300 goes to 1334 where the tag enables alert indicator hardware elements (e.g., alert indicator elements associated with alert indicator module 229 of FIG. 2). In next 1336, the tag periodically determines whether communication with the tag reader has been restored. If not [1336:NO], then 1346 is performed where method 1300 ends or other processing is performed (e.g., return to 1334 of FIG. 13B).

If so [1336:YES], then the tag takes the opportunity in 1338 to transmit an inferred theft notification report (e.g., inferred theft notification report 1106 of FIG. 11) as part of its response to the tag reader. In 1340, the tag determines whether the detected motion has stopped for some predetermined amount of time. If not [1340:NO], then method 1300 return to 1328.

If so [1340:YES], then the tag transmits information specifying that the tag is no longer in motion, as shown by 1342. The tag also disables further tag communications in 1344 if a predetermined amount of time has passed without motion. For example, the tag's transceiver is powered down. Subsequently, 1346 is performed where method 1300 ends or other processing is performed (e.g., by returning to 1310 of FIG. 13A).

With a system as described in FIG. 13, the tag uses the communication failure alert mode as a "help me" mode whereby it is requesting assistance because it knows it is out of communication with the system. The request for assistance would be through the visual or audible alerts. Likewise, the tag communicates if its battery is low or fully discharged and needs to be charged or that the tag needs to be moved. The tag can also communicate that it is not receiving enough charging and needs to be moved to a better location or have more energy delivered to that area.

The motion detection alerting is basically an anti-theft mode. With conventional RFID tags, it is possible to grab an RFID enabled product off the shelf. Then, a person can put the product into a metal bag or cup it in their hands so that it is difficult or impossible for any of the exit gate RFID readers to read the tag. This is one of the standard arguments against using RFID tags for security. However, a tag with a motion sensor enabled timing window as disclosed herein can be interrogated immediately when someone moves the tag and before it is placed into a bag.

The theft alert communicated to the tag reader as disclosed herein works well, but if the tag is concealed and can't be read at the exit gate, a security guard would still need to be alerted when tags were taken off the shelf, and communicate a motion alert to a reader. It is expensive to have guards on staff watching video, correlating the video with tag removal, and alerting the guards at the exit of a possible theft. A better solution is to take advantage of the motion sensor on the tag to trigger human perceptible alerts (e.g., audible alerts and/or visual alerts).

Because the motion sensor will continue to give an indication of motion to the tag, the tag controller knows how long it is in motion. Because the tag is battery assisted, it can track how long it is moving but is not read by a reader. These conditions suggest a high likelihood of theft. Because the tag cannot be interrogated during such times, an alternate form of notification is required. The alternative notification may be an LED flashing, but it is unlikely a hidden tag is physically visible. A buzzer or vibrator will provide an audible notification to either an electronic detector or a store employee. In addition, alternate forms of transmission can be added that are less susceptible to shielding and are detectable before the store exit. For example, ultra-sonic emitters and RF signaling at frequency ranges which are unlikely to be blocked can be suitable for this purpose. The result is a real time theft deterrent that indicates theft before the store exit.

In the solution presented herein, RFID tag communication collisions are advantageously avoided by using a time slotting technique. An advantage of this method of collision avoidance is that it can facilitate a dramatic reduction in power consumption at the RFID tag by powering down one or more tag onboard components which are involved in the communication process. In some scenarios, all such communication components can be shut down for maximum power savings. In other scenarios, some components can be put into a low power sleep mode where they are powered down, but other components such as the timer, motion sensor, and possibly the receiver are active. Energy harvesting can also remain active in this state. The advantage of this is that for a scenario involving a low power tag receiver, interrogation requests from the reader can still be received and facilitate analytics. But tag communication (transmissions) to the reader would only be enabled under certain conditions (e.g., if the time slot or motion event had occurred). With an energy harvesting tag, a further benefit is achieved in that certain components (such as the tag receiver) can potentially remain active even during the times when communications with the reader are otherwise disabled. Of course, other combinations of enabled components are also possible if power consumption is sufficiently low, and all such combinations are contemplated with the present disclosure.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for managing a tag, comprising:
placing the tag in a first operational mode in which at least one internal component necessary to facilitate communication between the tag and a tag reader is disabled;
selectively enabling the at least one internal component of the tag at a scheduled time to permit the tag to communicate with the tag reader;
performing monitoring operations at the tag to determine when at least one predetermined condition has been detected, the at least one predetermined condition comprising a motion condition;
causing the tag to autonomously perform at least one alerting function when the at least one predetermined condition has been detected; and
transmitting at least one signal to the tag reader indicating when the tag has been stationary for a predetermined period of time after the at least one predetermined condition was detected.

2. A method for managing a tag, comprising:
placing the tag in a first operational mode in which at least one internal component necessary to facilitate communication between the tag and a tag reader is disabled;
storing in a data store of the tag a schedule specifying at least one scheduled time during which the tag is permitted to communicate with a tag reader;
selectively enabling the at least one internal component of the tag at the at least one scheduled time to permit the tag to communicate with the tag reader;
performing monitoring operations at the tag to determine when at least one predetermined condition has been detected; and
causing the tag to autonomously perform at least one alerting function when the at least one predetermined condition has been detected;
wherein the alerting function comprises at least one of: (a) enabling a receiver of the tag to communicate with the tag reader at an unscheduled time; and (b) activating at least one alert by enabling a hardware alerting component provided on the tag;
wherein the at least one predetermined condition is a power management failure involving a failure to satisfy at least one measure of power management; and
wherein the measure of power management comprises a rate of charge delivered to an energy storage device in the tag, a measure of the amount of charge in the energy storage device, a measure of effectiveness of a power harvesting operation, or a power management index value.

3. A method for managing a tag, comprising:
placing the tag in a first operational mode in which at least one internal component necessary to facilitate communication between the tag and a tag reader is disabled;
storing in a data store of the tag a schedule specifying at least one scheduled time during which the tag is permitted to communicate with a tag reader;
selectively enabling the at least one internal component of the tag at the at least one scheduled time to permit the tag to communicate with the tag reader;

performing monitoring operations at the tag to determine when at least one predetermined condition has been detected;

causing the tag to autonomously perform at least one alerting function when the at least one predetermined condition has been detected; and selectively controlling the alert by delaying the enabling of the hardware alerting component to a preset time period which has been established for human perceptible alerting;

wherein the alerting function comprises at least one of: (a) enabling a receiver of the tag to communicate with the tag reader at an unscheduled time; and (b) activating at least one alert by enabling a hardware alerting component provided on the tag.

4. The method according to claim 1, wherein the motion condition is detected at the tag using information received from a motion sensor included in the tag.

5. The method according to claim 1, further comprising enabling the at least one internal component which is necessary to facilitate communications with the tag reader at an unscheduled time immediately upon detecting the motion condition.

6. A method for managing a tag, comprising:

placing the tag in a first operational mode in which at least one internal component necessary to facilitate communication between the tag and a tag reader is disabled;

storing in a data store of the tag a schedule specifying at least one scheduled time during which the tag is permitted to communicate with a tag reader;

selectively enabling the at least one internal component of the tag at the at least one scheduled time to permit the tag to communicate with the tag reader;

performing monitoring operations at the tag to determine when at least one predetermined condition has been detected, where the predetermined condition is a motion condition detected at the tag using information received from a motion sensor included in the tag;

enabling the at least one internal component which is necessary to facilitate communications with the tag reader at an unscheduled time immediately upon detecting the motion condition; and causing the tag to autonomously perform at least one alerting function when the at least one predetermined condition has been detected;

transmitting at least one signal to the tag reader indicating when the tag has been stationary for a predetermined period time after motion was detected;

wherein the alerting function comprises at least one of: (a) enabling a receiver of the tag to communicate with the tag reader at an unscheduled time; and (b) activating at least one alert by enabling a hardware alerting component provided on the tag.

7. The method according to claim 5, further comprising selectively deactivating or powering down the at least one internal component to disable communications with the tag reader after the tag has been stationary for a predetermined period of time.

8. The method according to claim 5, further comprising including in at least one transmitted communication to the tag reader motion indicator data to indicate that motion of the tag has been detected.

9. The method according to claim 4, further comprising: monitoring received signals from the tag reader at least during a time period while said motion is detected; and activating the at least one alert immediately upon determining that communication from the tag reader has been interrupted while communications with the tag reader are enabled.

10. The method according to claim 9, further comprising transmitting at least one signal to the tag reader indicating a theft alert if communication with the tag reader is restored at any time subsequent to being interrupted.

11. The method according to claim 1, further comprising disabling the at least one internal component necessary for tag communications with the tag reader until a predetermined time slot or condition occurs.

12. The method according to claim 11, further comprising disabling the at least one necessary internal components without powering down selected ones of a plurality of internal components.

13. The method according to claim 12, wherein the select ones of the plurality of internal components comprise a timer and a motion sensor.

14. A system, comprising:

a processor; and a non-transitory computer-readable storage medium comprising programming instructions that are configured to cause the processor to implement a method for managing a tag, wherein the programming instructions comprise instructions to:

place the tag in a first operational mode in which at least one internal component necessary to facilitate communication between the tag and a tag reader is disabled;

selectively enable the at least one internal component of the tag at a scheduled time to permit the tag to communicate with the tag reader;

perform monitoring operations at the tag to determine when at least one predetermined condition has been detected;

cause the tag to autonomously perform at least one alerting function when the at least one predetermined condition has been detected; and cause transmission of at least one signal to the tag reader indicating when the tag has been stationary for a predetermined period of time after the at least one predetermined condition was detected.

15. A system, comprising:

a processor; and a non-transitory computer-readable storage medium comprising programming instructions that are configured to cause the processor to implement a method for managing a tag, wherein the programming instructions comprise instructions to:

place the tag in a first operational mode in which at least one internal component necessary to facilitate communication between the tag and a tag reader is disabled;

store in a data store of the tag a schedule specifying at least one scheduled time during which the tag is permitted to communicate with a tag reader;

selectively enable the at least one internal component of the tag at the at least one scheduled times to permit the tag to communicate with the tag reader;

perform monitoring operations at the tag to determine when at least one predetermined condition has been detected; and cause the tag to autonomously perform at least one alerting function when the at least one predetermined condition has been detected;

wherein the alerting function comprises at least one of: (a) enabling a receiver of the tag to communicate with the tag reader at an unscheduled time; and (b) activating at least one alert by enabling a hardware alerting component provided on the tag;

wherein the at least one predetermined condition is a power management failure involving a failure to satisfy at least one measure of power management; and wherein the measure of power management comprises a rate of charge delivered to an energy storage device in the tag, a measure of the amount of charge in the energy storage device, a measure of effectiveness of a power harvesting operation, or a power management index value.

16. A system, comprising:

a processor; and a non-transitory computer-readable storage medium comprising programming instructions that are configured to cause the processor to implement a method for managing a tag, wherein the programming instructions comprise instructions to:

place the tag in a first operational mode in which at least one internal component necessary to facilitate communication between the tag and a tag reader is disabled;

store in a data store of the tag a schedule specifying at least one scheduled time during which the tag is permitted to communicate with a tag reader;

selectively enable the at least one internal component of the tag at the at least one scheduled times to permit the tag to communicate with the tag reader;

perform monitoring operations at the tag to determine when at least one predetermined condition has been detected; and cause the tag to autonomously perform at least one alerting function when the at least one predetermined condition has been detected;

wherein the alerting function comprises at least one of: (a) enabling a receiver of the tag to communicate with the tag reader at an unscheduled time; and (b) activating at least one alert by enabling a hardware alerting component provided on the tag; and wherein the programming instructions further comprise instructions to selectively control the alert by delaying the enabling of the hardware alerting component to a preset time period which has been established for human perceptible alerting.

17. The system according to claim 14, wherein the motion condition is detected at the tag using information received from a motion sensor included in the tag.

18. The system according to claim 14, wherein the programming instructions further comprise instructions to enable the at least one internal component which is necessary to facilitate communications with the tag reader at an unscheduled time immediately upon detecting the motion condition.

19. A system, comprising:

a processor; and a non-transitory computer-readable storage medium comprising programming instructions that are configured to cause the processor to implement a method for managing a tag, wherein the programming instructions comprise instructions to:

place the tag in a first operational mode in which at least one internal component necessary to facilitate communication between the tag and a tag reader is disabled;

store in a data store of the tag a schedule specifying at least one scheduled time during which the tag is permitted to communicate with a tag reader;

selectively enable the at least one internal component of the tag at the at least one scheduled times to permit the tag to communicate with the tag reader;

perform monitoring operations at the tag to determine when at least one predetermined condition has been detected; and cause the tag to autonomously perform at least one alerting function when the at least one predetermined condition has been detected;

wherein the alerting function comprises at least one of: (a) enabling a receiver of the tag to communicate with the tag reader at an unscheduled time; and (b) activating at least one alert by enabling a hardware alerting component provided on the tag;

wherein the predetermined condition is a motion condition detected at the tag using information received from a motion sensor included in the tag;

wherein the programming instructions further comprise instructions to enable the at least one internal component which is necessary to facilitate communications with the tag reader at an unscheduled time immediately upon detecting the motion condition; and wherein the programming instructions further comprise instructions to transmit at least one signal to the tag reader indicating when the tag has been stationary for a predetermined period time after motion was detected.

20. The system according to claim 18, wherein the programming instructions further comprise instructions to selectively deactivate or power down the at least one internal component to disable communications with the tag reader after the tag has been stationary for a predetermined period of time.

21. The system according to claim 18, wherein the programming instructions further comprise instructions to include in at least one transmitted communication to the tag reader motion indicator data to indicate that motion of the tag has been detected.

22. The system according to claim 17, wherein the programming instructions further comprise instructions to:

monitor received signals from the tag reader at least during a time period while said motion is detected; and activate the at least one alert immediately upon determining that communication from the tag reader has been interrupted while communications with the tag reader are enabled.

23. The system according to claim 22, wherein the programming instructions further comprise instructions to transmit at least one signal to the tag reader indicating a theft alert if communication with the tag reader is restored at any time subsequent to being interrupted.

24. The system according to claim 14, wherein the programming instructions further comprise instructions to disable the at least one internal component necessary for tag communications with the tag reader until a predetermined time slot or condition occurs.

25. The system according to claim 24, wherein the programming instructions further comprise instructions to disable the at least one necessary internal components without powering down selected ones of a plurality of internal components.

26. The method according to claim 25, wherein the select ones of the plurality of internal components comprise a timer and a motion sensor.

27. A method for managing a tag, comprising:
- performing monitoring operations at the tag to determine when a motion condition has been detected; and
- transmitting at least one signal from the tag to a tag reader indicating when the tag has been stationary for a predetermined period of time after the motion condition was detected.

* * * * *